No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 1.

Witnesses
L. Douville,
O. F. Nagle

Inventor
Frank Schafer.
By Diedensheim & Fairbanks
Attorneys

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 2.
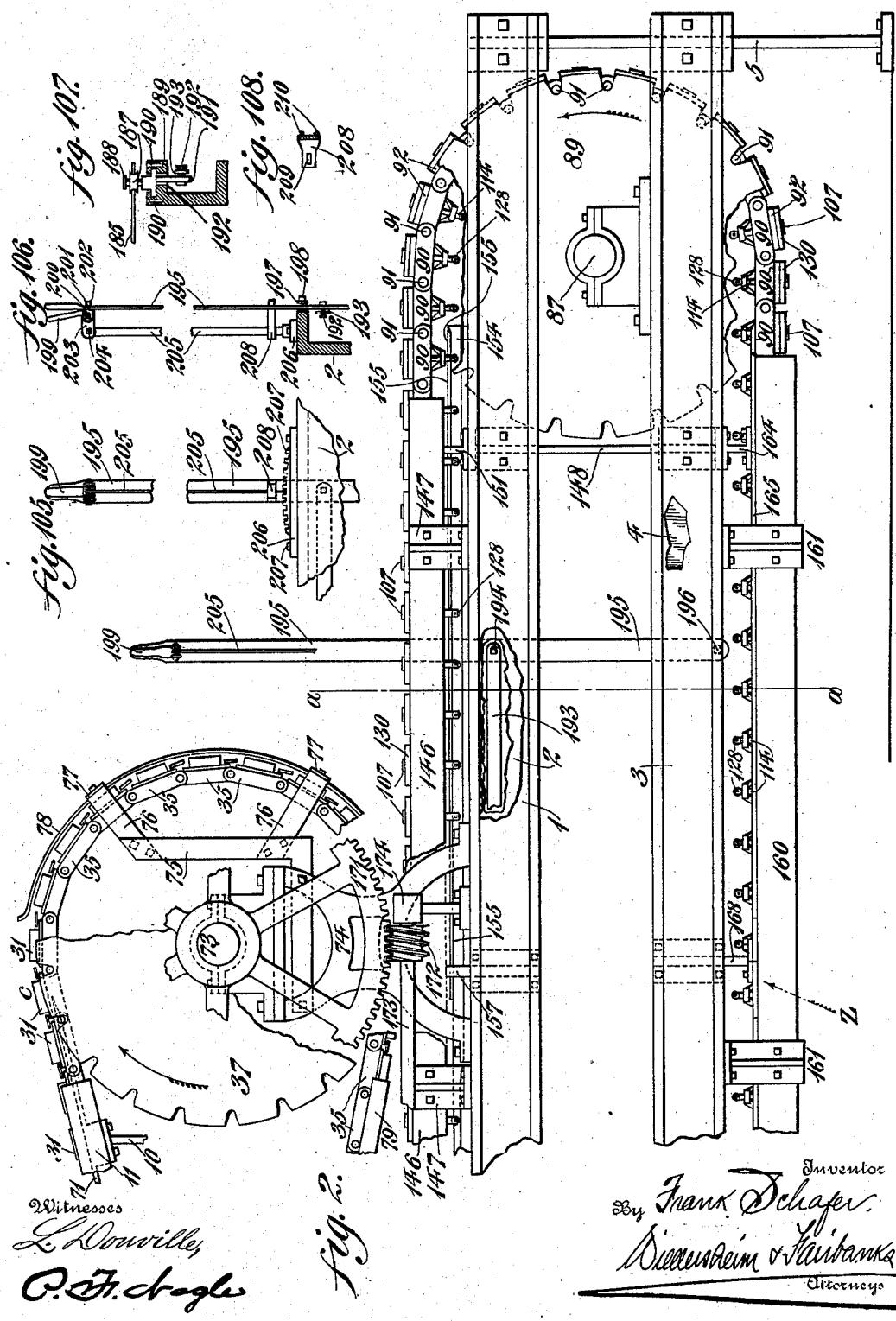

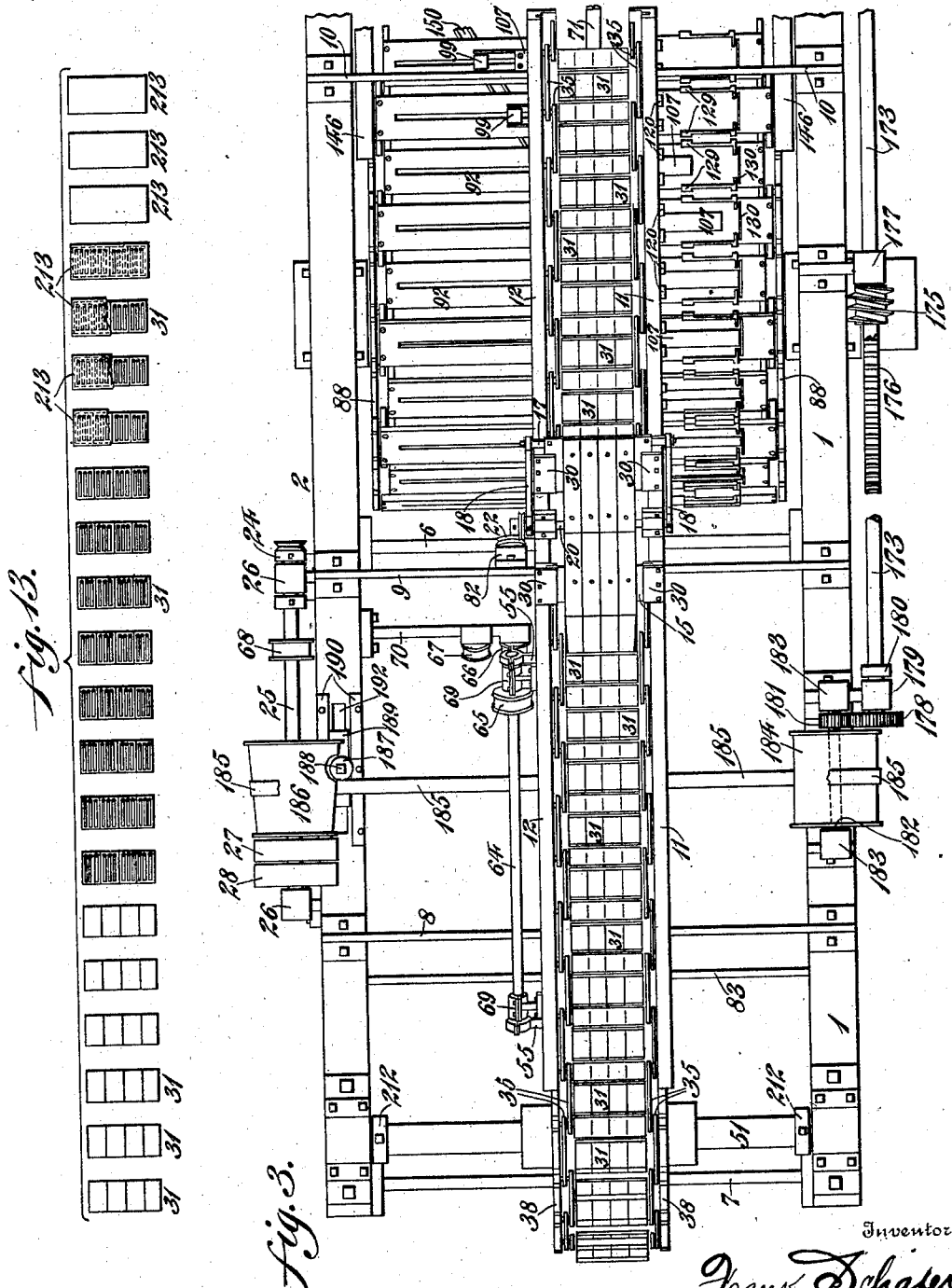

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 4.
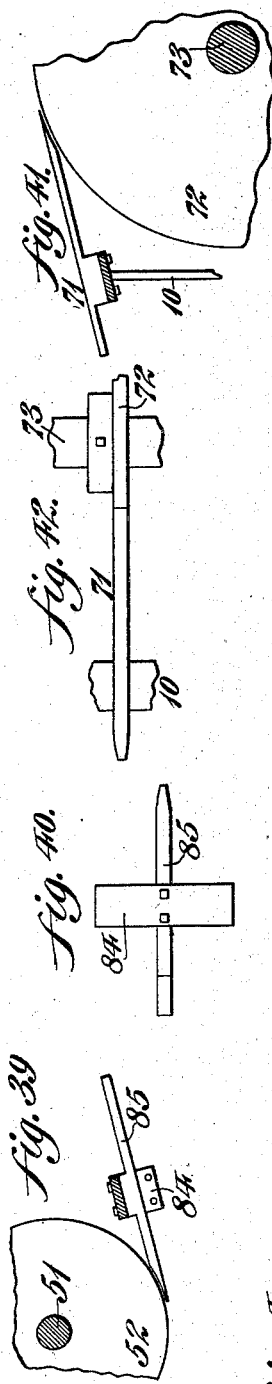
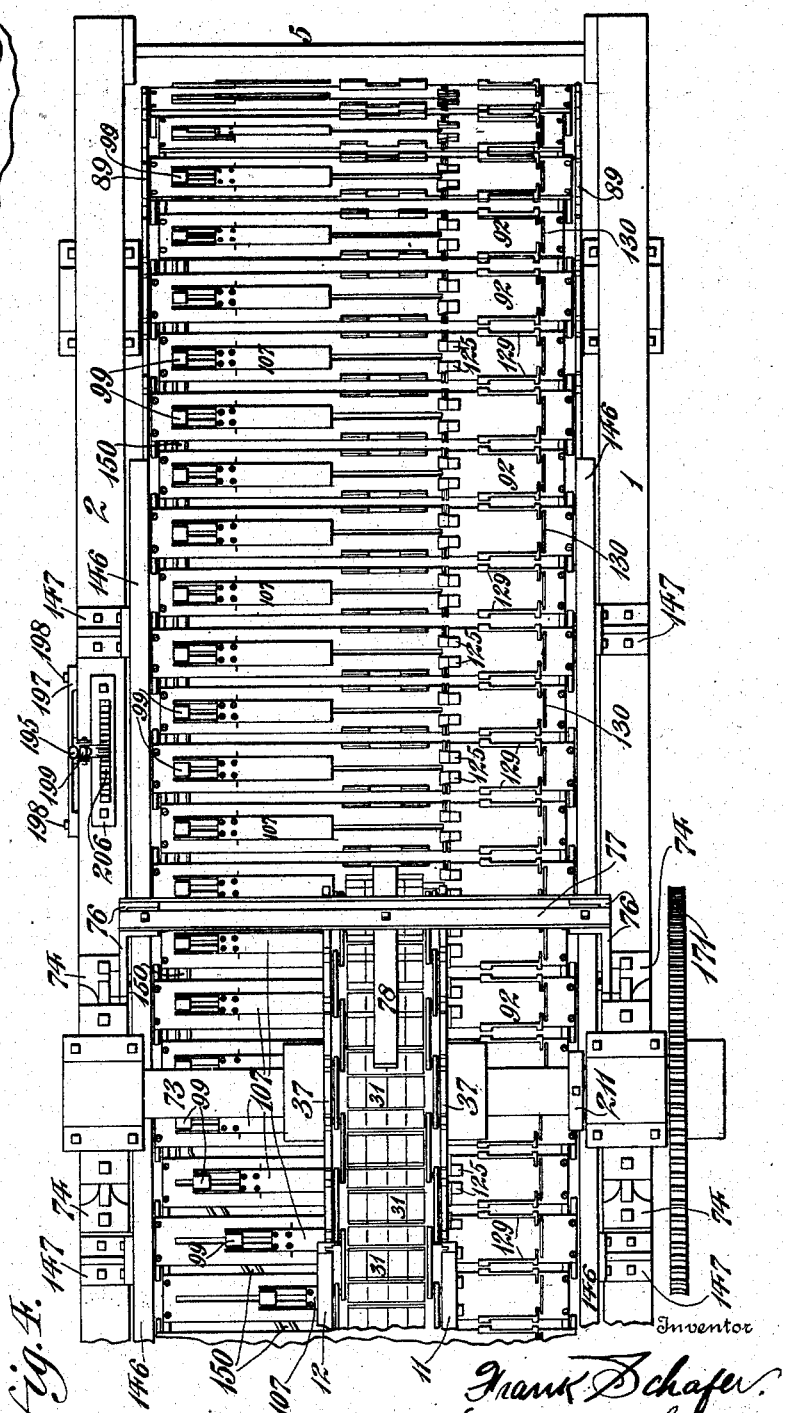

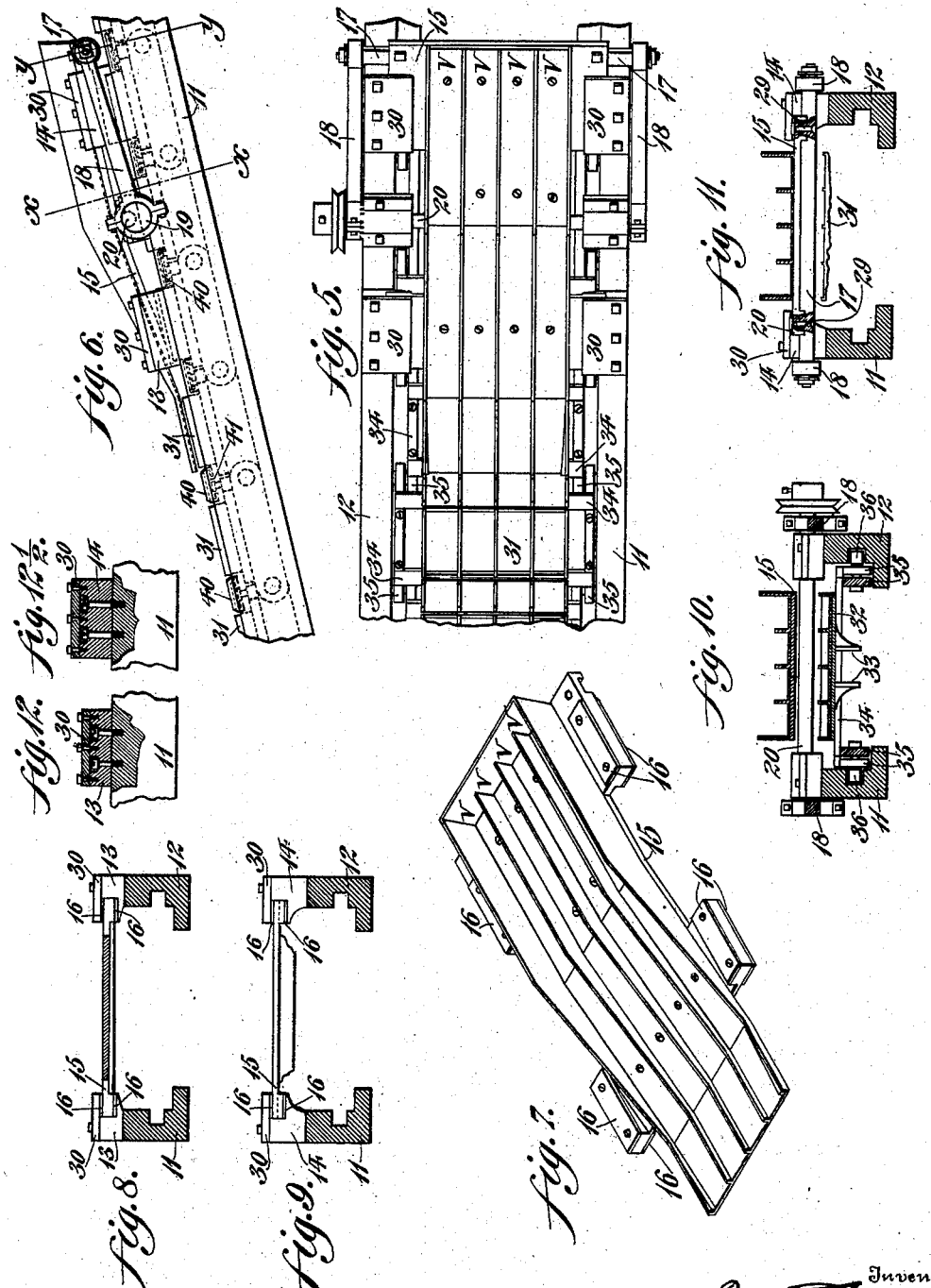

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 6.
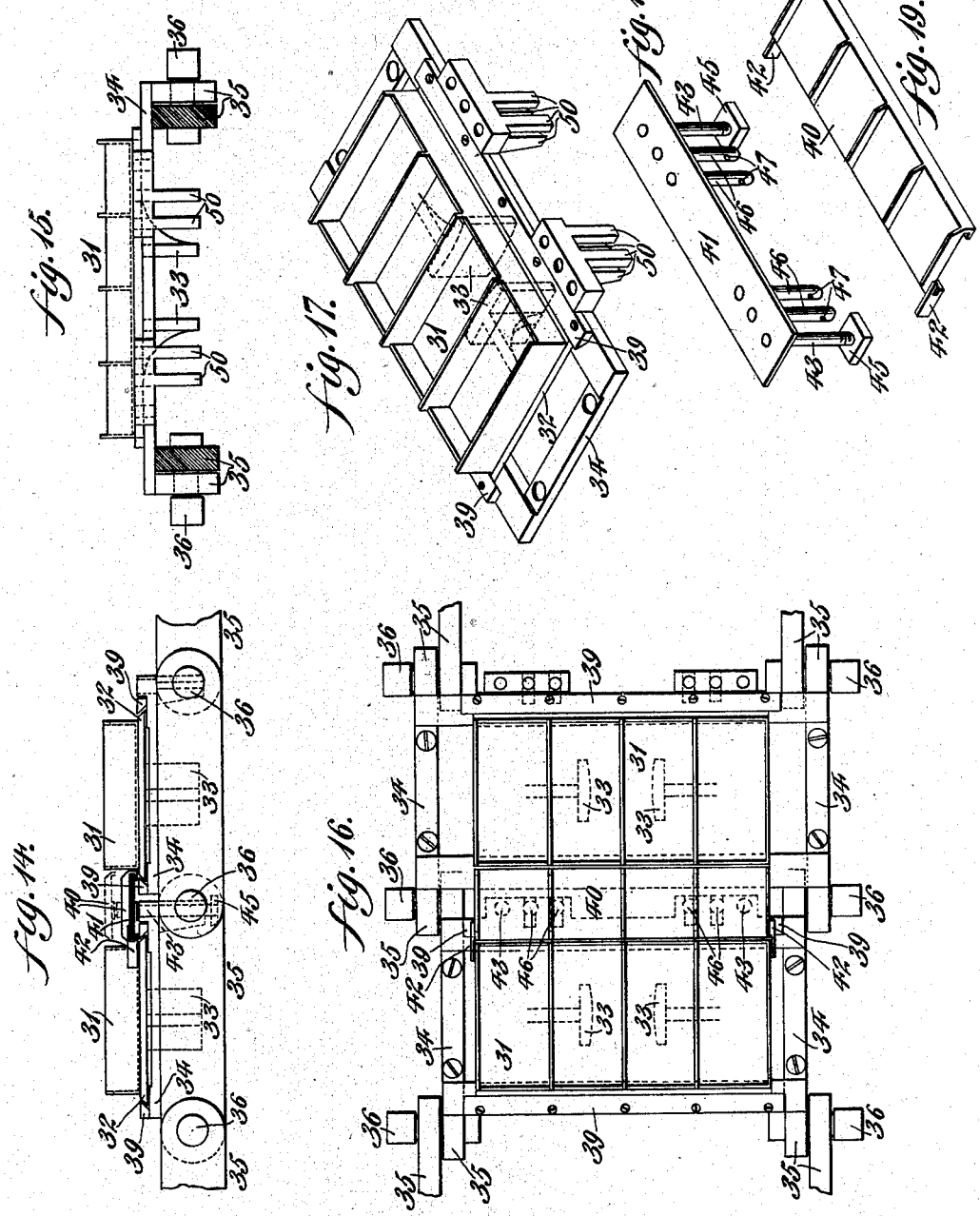

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 7.
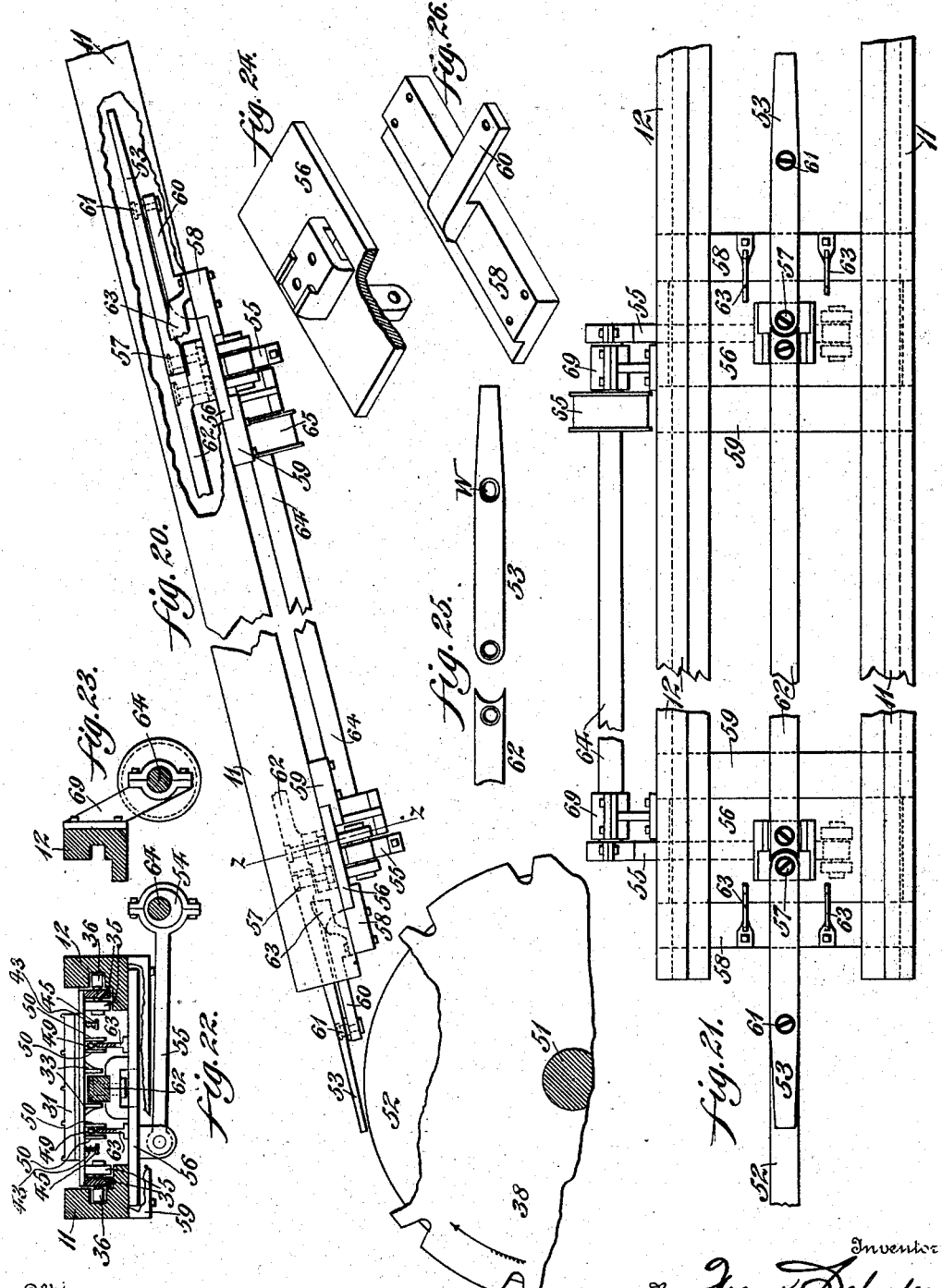

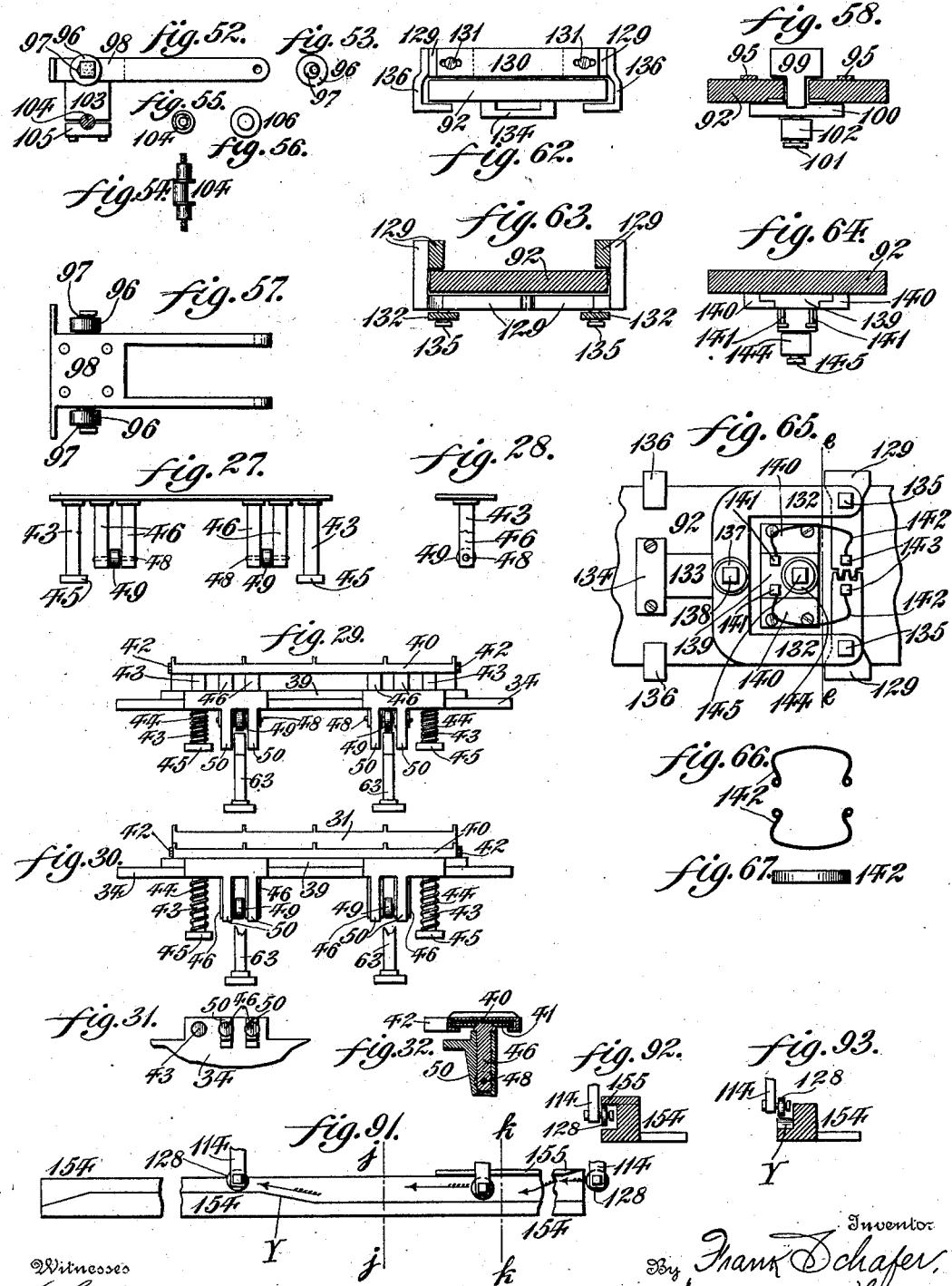

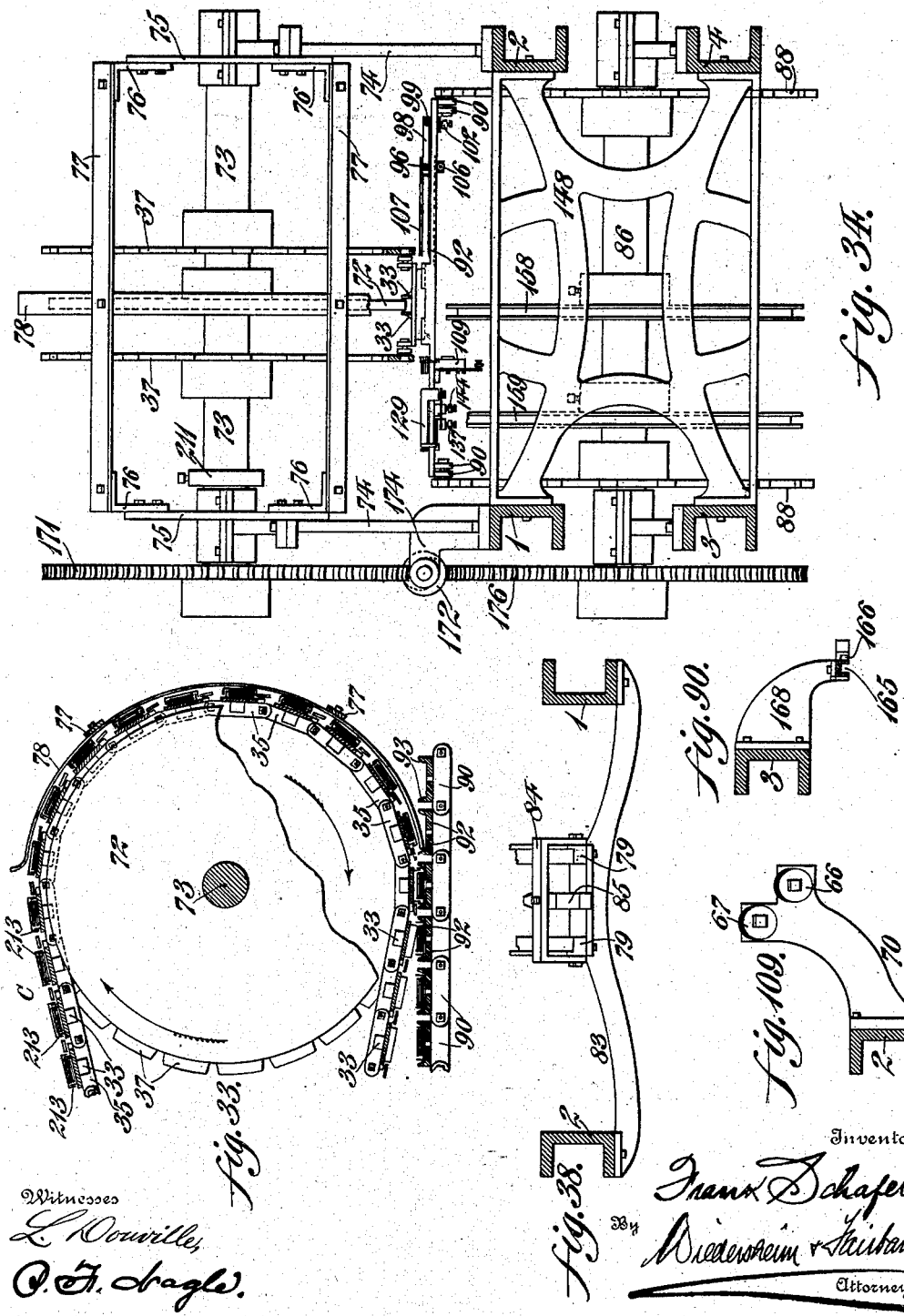

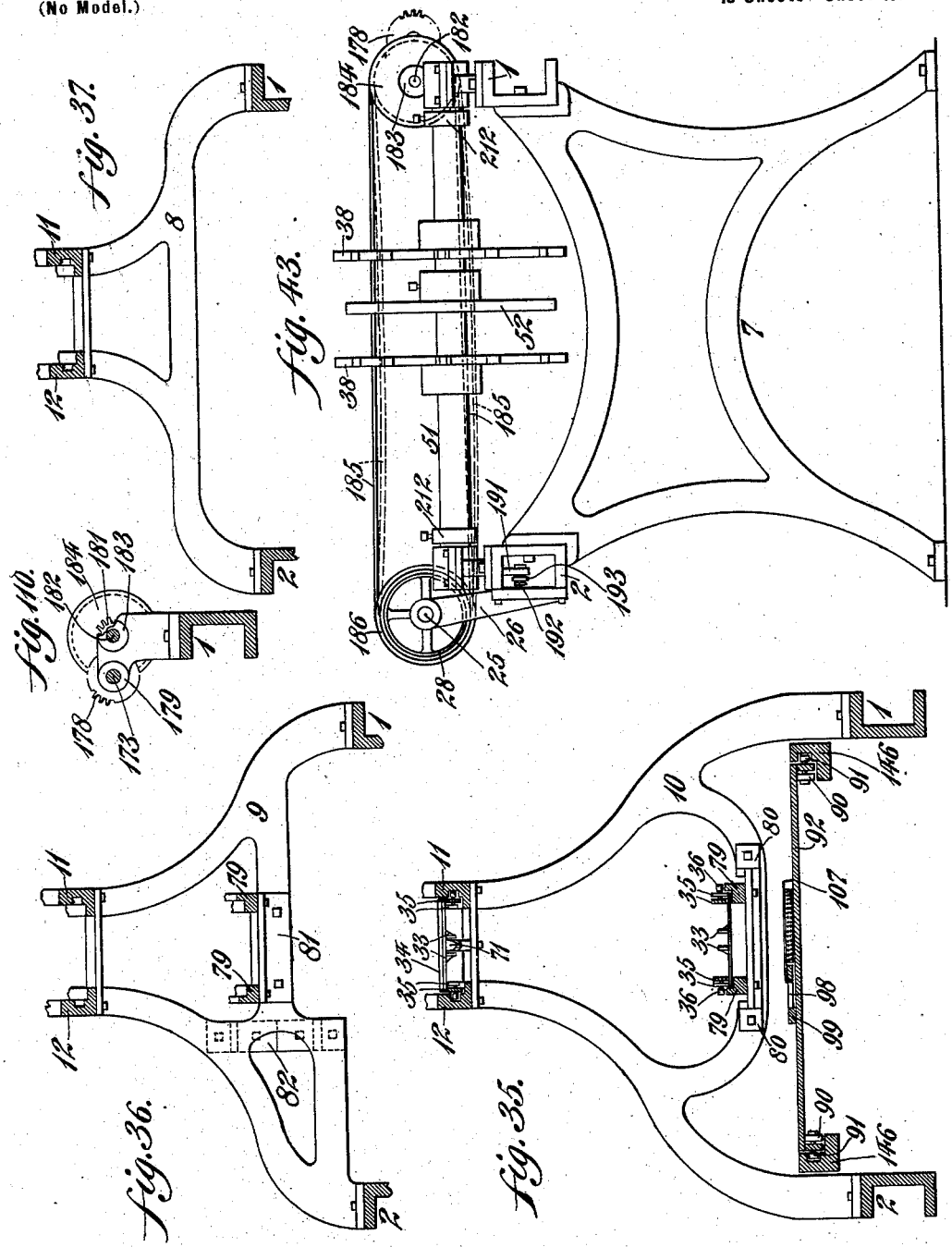

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 11.
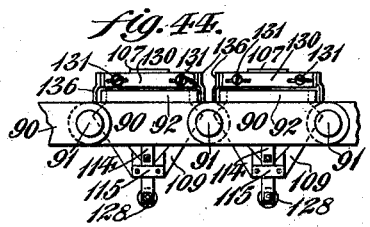
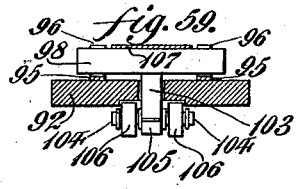
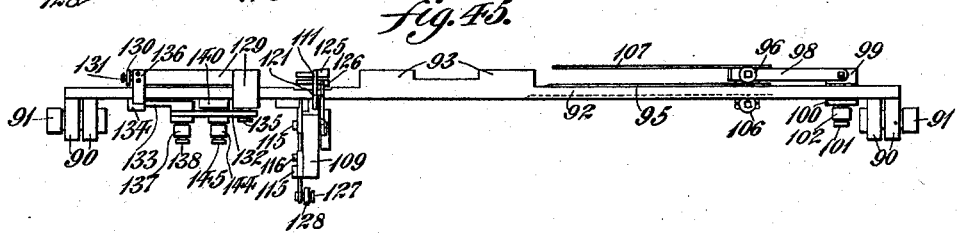
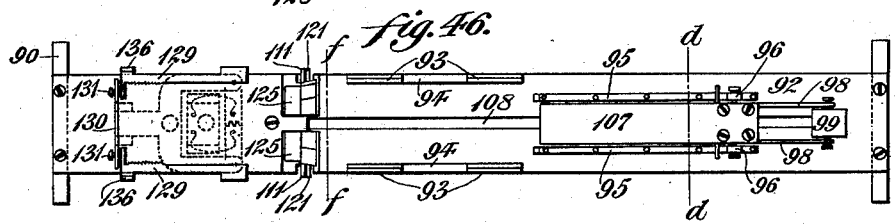
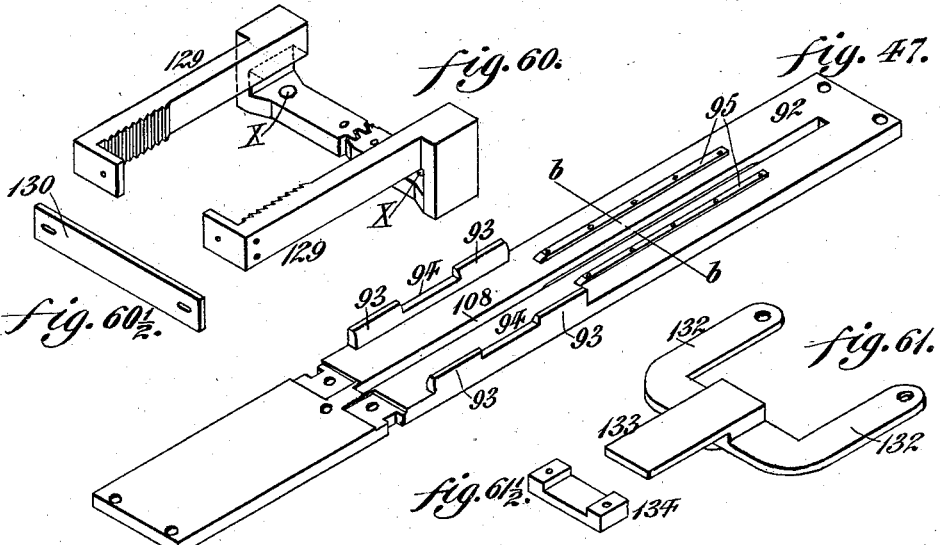
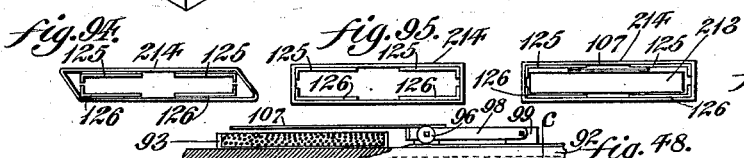
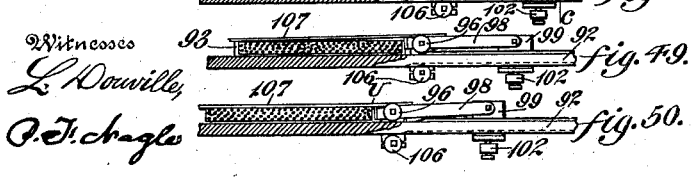

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 12.
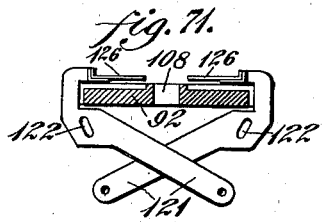
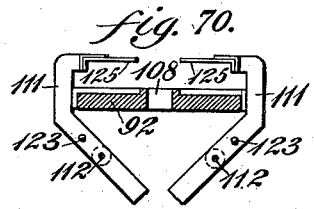
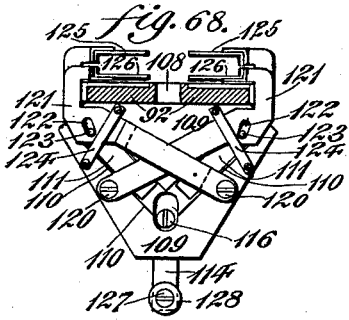
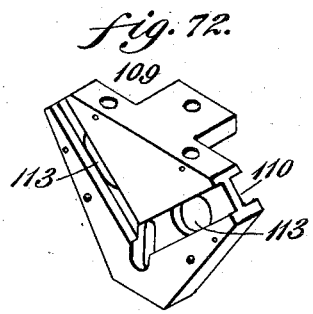
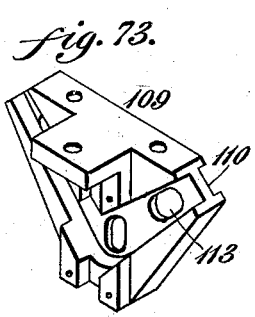
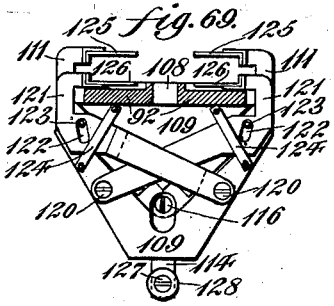
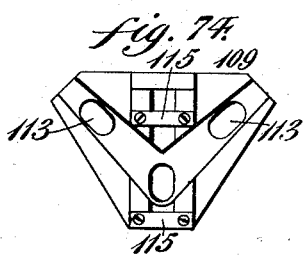
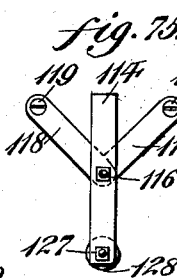
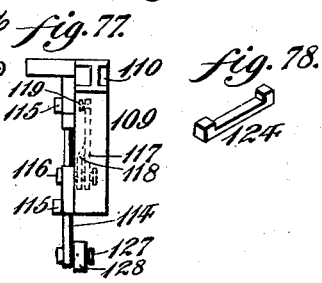
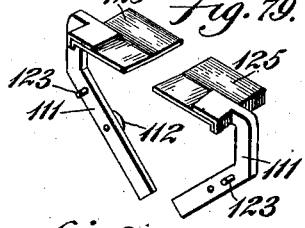
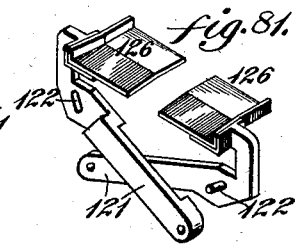
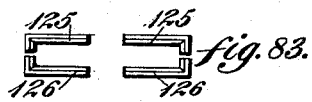
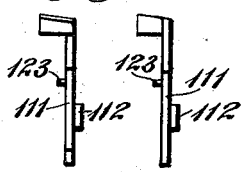
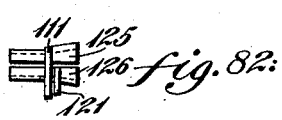
Witnesses
L. Douville,
O. F. ...
Inventor
By Frank Schafer.
Audersheim & Fairbanks.
Attorneys
THE NORRIS PETERS CO., PHOTO-LITHO., WASHINGTON, D. C.

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 13.
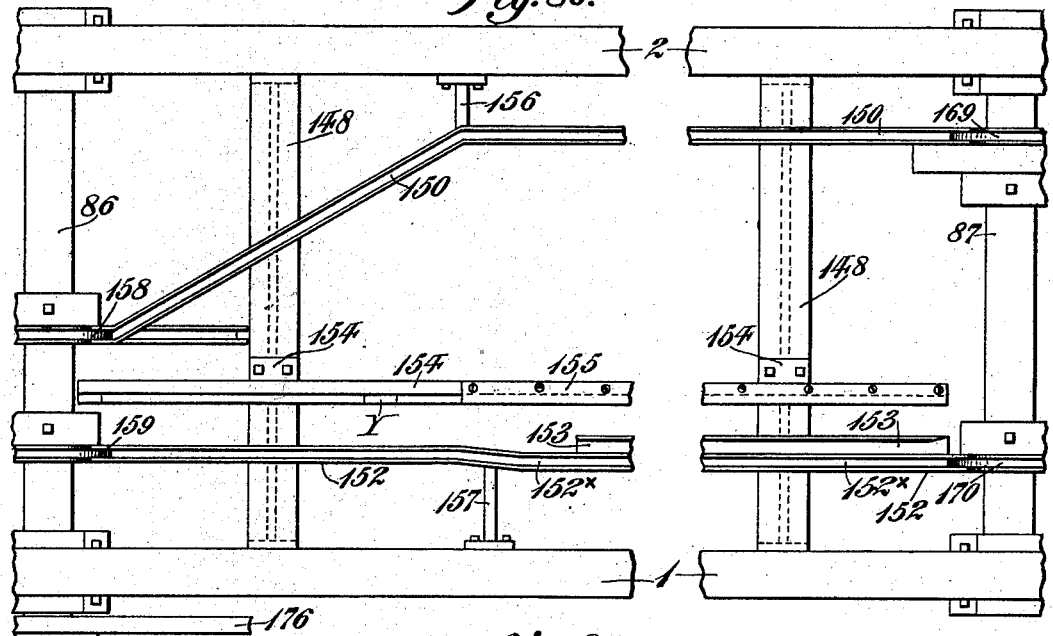
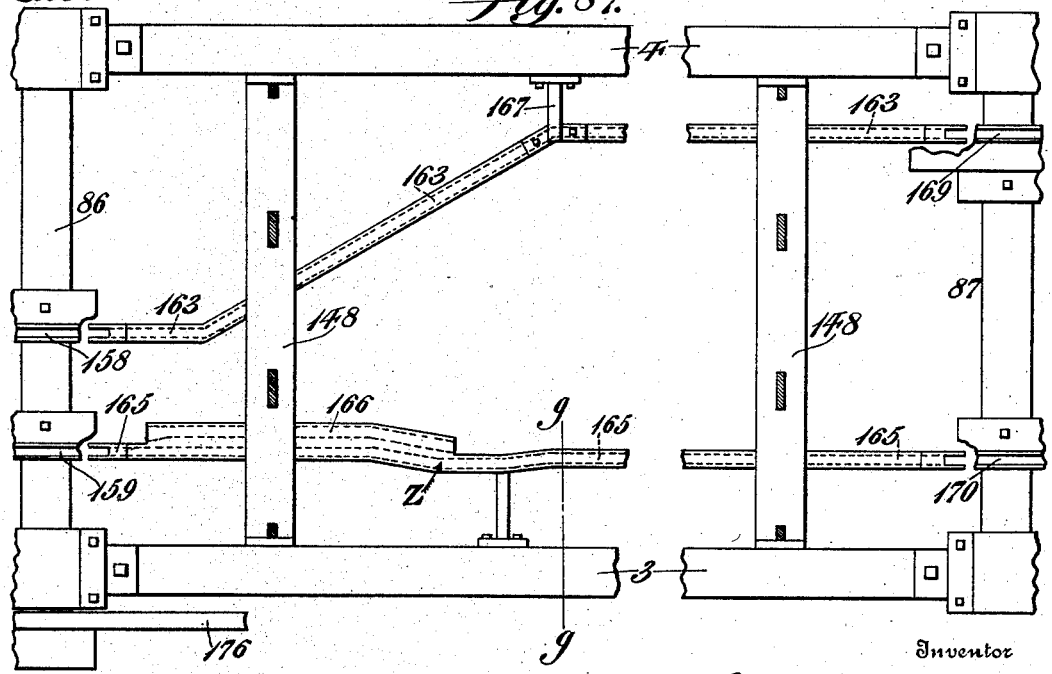

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 14.
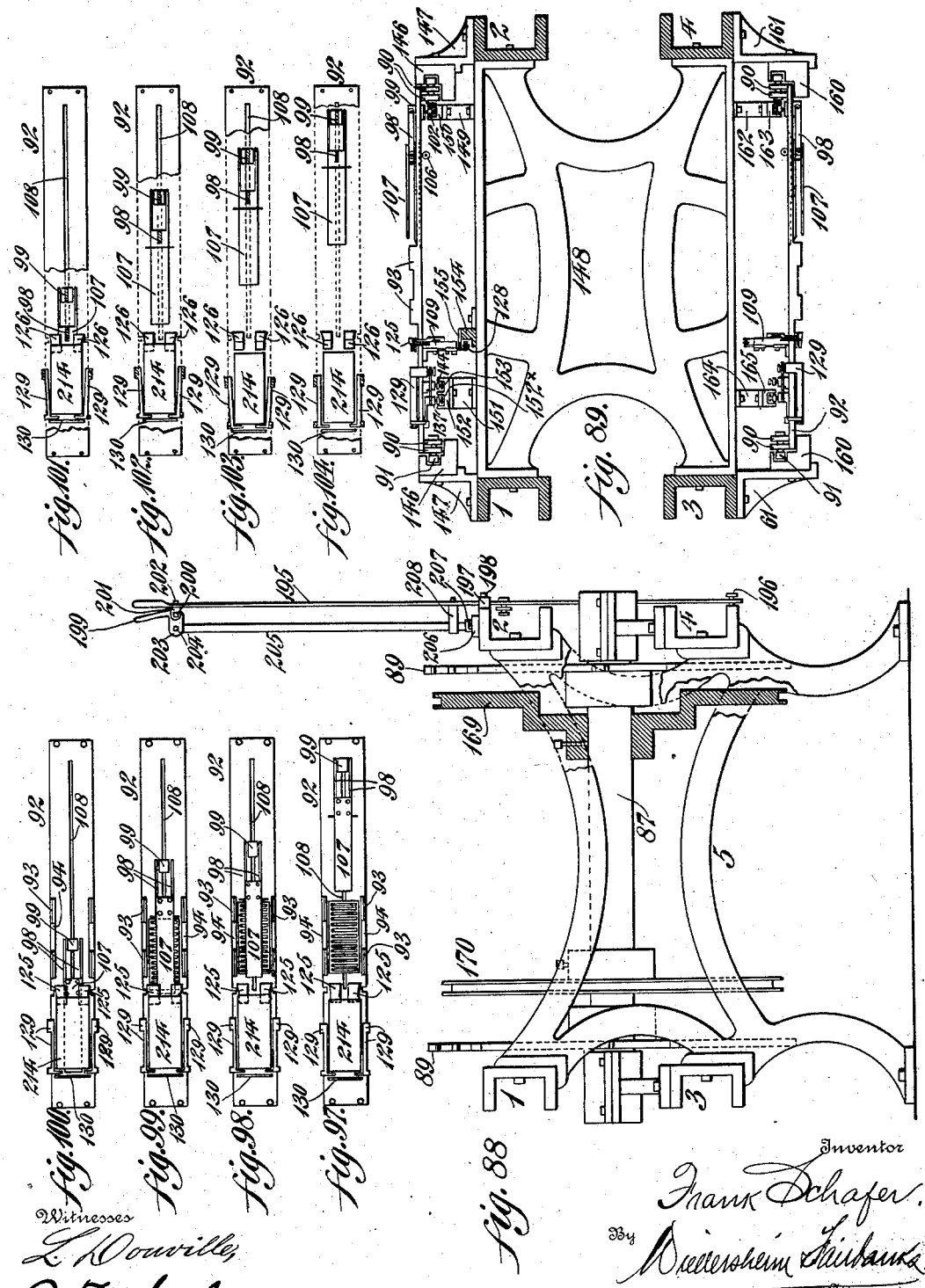

No. 712,419. Patented Oct. 28, 1902.
F. SCHAFER.
MACHINE FOR FILLING AND CLOSING MATCH BOXES.
(Application filed May 14, 1901.)
(No Model.) 15 Sheets—Sheet 15.
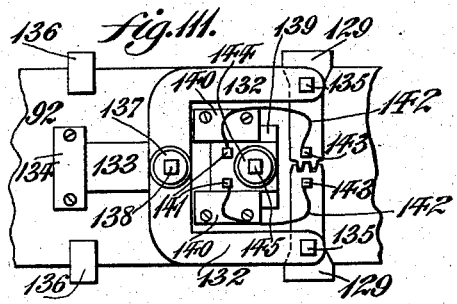
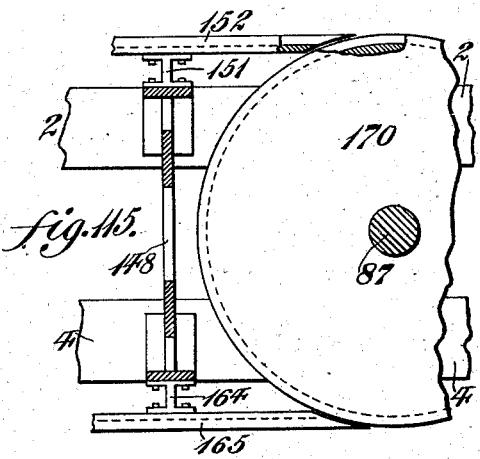
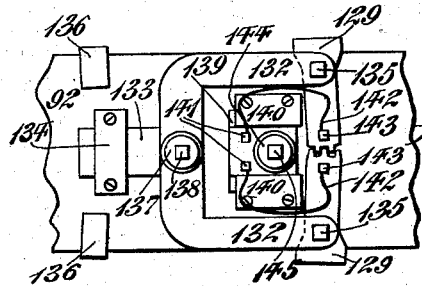
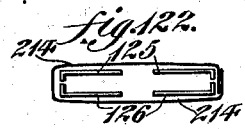
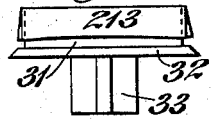
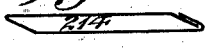
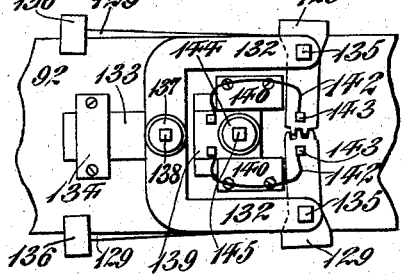
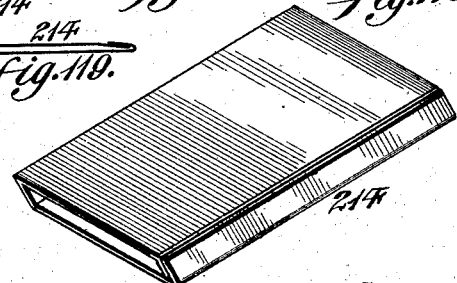
Witnesses
Inventor
Frank Schafer,
Wiedersheim & Fairbanks.
By Attorneys
THE NORRIS PETERS CO., PHOTO-LITHO., WASHINGTON, D. C.

UNITED STATES PATENT OFFICE.

FRANK SCHAFER, OF PHILADELPHIA, PENNSYLVANIA.

MACHINE FOR FILLING AND CLOSING MATCH-BOXES.

SPECIFICATION forming part of Letters Patent No. 712,419, dated October 28, 1902.

Application filed May 14, 1901. Serial No. 60,194. (No model.)

*To all whom it may concern:*

Be it known that I, FRANK SCHAFER, a citizen of the United States, residing in the city and county of Philadelphia, State of Pennsylvania, have invented a new and useful Improvement in Machines for Automatically Filling and Closing Match-Boxes, of which the following is a specification.

My invention consists of a novel construction of a machine wherein the finished matches or any other like finished material are filled in false boxes from which a match-box or tray is placed in an inverted position, which by the device hereinafter described are caused to fill the same and are caused to slide into the tube or outside covering of match-boxes automatically.

It also consists of novel devices by which every box is filled in regular succession.

It also consists of a novel device to regulate the speed of the false boxes in case of any irregularity in the quantity of matches which are fed to the machine.

It further consists of novel details of construction, all as will be hereinafter set forth.

Figures 1 and 2 represent side elevations of a machine for filling match-boxes embodying my invention, one portion thereof shown in Fig. 1 and another in Fig. 2. Figs. 3 and 4 represent a plan view of a machine, showing one part of the machine in one figure and another portion in the other. Fig. 5 represents a plan view, on an enlarged scale, of a shaker employed which receives the matches and causes them to slide into the false boxes. Fig. 6 represents a side view thereof. Fig. 7 represents a perspective view of the shaking device. Fig. 8 represents a sectional view showing guide-bars and plate which carries the shaker and method of fastening the guideways. Fig. 9 represents a similar view showing guideways for the front end of the shaker. Fig. 10 represents a sectional view on line $xx$, Fig. 6, showing how the shaft 20 clears the shaker and also false boxes. Fig. 11 represents a sectional view on line $yy$, Fig. 6, showing how the bars 17 clear the false boxes and also method of fastening same to the shaker. Figs. 12 and 12½ represent side views of a portion of the device, showing method of securing the guideways 13 and 14 to guide-bars 11 and 12. Fig. 13 represents a plan view of a series of the false boxes in a horizontal position, showing the manner of filling the same. Fig. 14 represents, on an enlarged scale, a side view of a portion of the links or chains of the false boxes. Fig. 15 represents an end view thereof. Fig. 16 represents a plan view of the style of false boxes employed. Fig. 17 represents a perspective view of false boxes, showing the frame on which they slide, said frame being fastened at both ends to links which are made to form an endless chain. It also shows the guideways by means of gibs, wherein the false boxes are caused to reciprocate in a lateral direction. Fig. 18 represents a perspective view of a portion of the device for bridging the distances between the false boxes when being filled with matches. Fig. 19 represents a perspective view of the bridge which is carried by the device shown in Fig. 18. Fig. 20 represents a side view, on an enlarged scale, of the device for imparting the reciprocating motion of the false boxes, showing the same broken. Fig. 21 represents a plan view thereof, omitting the sprocket 38. Fig. 22 represents a sectional view on line $zz$, Fig. 20, looking toward the guide-wheel 52. Fig. 23 represents a view showing detached the bearing for shaft 64, said bearing being fastened to guide-bar 12. Fig. 24 represents a perspective view of the slide seen in Fig. 20, partly broken. Fig. 25 represents a plan view of the reciprocating bar, showing the elongated hole X, which is loosely pivoted on the extension 60, seen in Fig. 26. Fig. 26 represents a perspective view of the guideways for the slide. Fig. 27 represents a side view of the device shown in Fig. 18 with roller in proper place. Fig. 28 represents an end view thereof. Fig. 29 represents an end view of a portion of the chain and the device for raising the bridge with the bridge elevated. Fig. 30 represents an end view thereof with the bridge in normal position. Fig. 31 represents a detached portion of the frame upon which false boxes slide in reversed position and showing the guideways for bar 46. Fig. 32 represents a sectional view of the guideways for the bridge-raising device. Fig. 33 represents a practical side elevation and sectional view showing the passage of the filled false boxes around the sprocket 37. Fig. 34 represents an irregular sectional view showing relation of parts cut on a line about $aa$, Fig. 2. Fig. 35 represents a view showing the construction and use of the support 10 as seen in Fig. 1. Fig. 36 represents a view showing the construction and use of the support 9 as seen in Fig. 1. Fig. 37 represents a view showing the construction and use of the support 8 as seen in Fig. 1. Fig. 38 represents a view showing the construction and use of the beam 83 as seen in Fig. 1. Fig. 39 represents a side view of a portion of the deflecting-guide 85 in detached position which guides the false boxes to guide-wheel 52. Fig. 40 represents a plan view thereof with guide-wheel 52 removed. Fig. 41 represents a side view of a portion of the deflecting-guide 71 in detached position which guides the false boxes in the guide-wheel 72. Fig. 42 represents a plan view thereof. Fig. 43 represents an end view of the machine, showing sprockets 38 and guide-wheel 52 with the chain of false boxes removed. Fig. 44 represents a side view of the link mechanism and chain for sliding the match-trays within the match-tube, showing a section thereof. Fig. 45 represents an end view thereof. Fig. 46 represents a plan view thereof. Fig. 47 represents a perspective view of the plate upon which the machine operates which slides the tray within the tube, the operating parts being removed. Figs. 48, 49, and 50 represent partial sectional views of the pusher and blade shown in different positions. Fig. 51 represents a section on line $bb$, Fig. 47. Fig. 52 represents a side view of the pushing device for causing the tray to enter the tube. Fig. 53 represents a side view of a roller and adjustable eccentric-sleeve for pusher. Fig. 54 represents a plan view of the adjustable double eccentric-stud for lower side of pusher. Fig. 55 represents an end view of double eccentric-stud. Fig. 56 represents a side view of the rollers. Fig. 57 represents a plan view of the pusher. Fig. 58 represents a sectional view on line $cc$, Fig. 48. Fig. 59 represents a sectional view on line $dd$, Fig. 46. Fig. 60 represents an enlarged perspective view of the corrugated clasp for holding the match-box tube. Fig. $60\frac{1}{2}$ represents a perspective view of a guide-plate for said clamps, Fig. 60. Fig. 61 represents an enlarged perspective view of the sliding fork upon which the clamps seen in Fig. 60 are pivoted. Fig. $61\frac{1}{2}$ represents a perspective view of a guide for the sliding fork. Fig. 62 represents an end view of the plate 92, showing the guide-bracket secured to clamp 129. Fig. 63 represents a sectional view on lines $ee$, Fig. 65. Fig. 64 represents an end view of the slides and guide-slot roller which causes the clamp to open or close. Fig. 65 represents a reversed plan view of the fork and clamps and slide for operating clamps. Fig. 66 represents a plan view of the two springs seen in Fig. 65. Fig. 67 represents a side view of the spring seen in Fig. 65. Figs. 68 and 69 represent sectional views on line $ff$, Fig. 46, showing the funnel-operating device in different positions. Figs. 70 and 71 represent side elevations of parts seen in Figs. 68 and 69 in detached position. Fig. 72 represents a perspective front view of the frame upon which the mechanism, Fig. 68, works. Fig. 73 represents a perspective back view of the same. Fig. 74 represents a back view of Fig. 73, showing straps 115 in position. Fig. 75 represents a view of sliding bars and connecting-links for bar 114 in place. Fig. 76 represents a side view of the sliding bar and connecting-link in an angular position, showing the bending of link 118. Fig. 77 represents a side view of frame 109, showing the sliding bar in place, a portion of the mechanism being removed. Fig. 78 represents a perspective view of a strap seen in Figs. 68 and 69. Fig 79 represents a perspective view of sliding funnel-bars and funnel-plates. Fig. 80 represents a side view of the bars shown in Fig. 79. Fig. 81 represents a perspective view of pivoted funnel-bars and funnel-plates. Fig. 82 represents a side view of the funnel-bars, showing one in front of the other. Fig. 83 represents a front or face view of the funnel seen in Fig. 68. Certain of the parts of the funnel are shown fully in Fig. 68. Fig. 84 represents a plan view thereof. Fig. 85 represents a side view thereof. Fig. 86 represents a plan view of the upper guide-slots for causing the tray of matches to enter the tube. Fig. 87 represents a plan view of the lower guide-slots for causing the tray of matches to enter the tube. Fig. 88 represents an end view of the lower part of the machine, showing the speed-regulating device, guide-slot wheels, and sprockets with chain or links removed. Fig. 89 represents a sectional view showing the upper and lower guide-slots as seen in Figs. 86 and 87. Fig. 90 represents a sectional view on line $gg$, Fig. 87. Fig. 91 represents, in detached position, an enlarged side view of the bars which cause the funnel mechanism to operate. Fig. 92 represents a sectional end view on line $kk$, Fig. 91. Fig. 93 represents a sectional end view through lines $jj$, Fig. 91. Fig. 94 represents an end view of a tube with a funnel therein before the latter is expanded. Fig. 95 represents an end view of a tube with a funnel therein, showing the same expanded. Fig. 96 represents a view showing a tube expanded by funnel and with tray 107 entering. Figs. 97 to 100, inclusive, represent plan views of the mechanism on plate 92, showing the different positions of certain parts relative to sliding the tray within the tube; and Figs. 101 to 104 represent reversed plan views showing the tube and tray off of the funnel. Fig. 105 represents a side view of part of the lever, rack, and bar to regulate the speed of the machine. Fig. 106 represents a side view thereof. Fig. 107 represents an end view of the roller-slide which guides the belt 185. Fig. 108 represents a plan view of the guide for the bar 205. Fig. 109 represents a side view of the bracket for supporting the V-rollers to operate the shaker. Fig. 110 represents a sectional view of the bearing and bracket for supporting shafts 173 and 182. Figs. 111, 112, 113, and 114 represent reversed plan views showing the position of the slide, forks, and clamps as seen in Fig. 98 in different positions. Fig. 115 represents a side view showing the brackets for supporting guide-slots 150, 152, 163, and 165. Fig. 116 represents a perspective view of a match-tray employed. Fig. 117 represents an end view showing a match-tray inverted on a false box. Fig. 118 represents a perspective view of a box-tube or tube for matches. Figs. 119 to 121, inclusive, represent end views of the various shapes assumed by the tube. Fig. 122 represents an end view of the tube, which on being pressed at the edges by an operator takes the shape as seen in this figure on being placed on the funnel. On being released it assumes the shape as seen in Fig. 94.

Similar characters of reference indicate corresponding parts in the figures.

Referring to the drawings, in Figs. 1, 2, 3, 4, and 88, 1 2 3 4 designate iron beams which are supported by the legs 5, 6, and 7.

8 9 10 designate supports which are bolted or otherwise secured to the beams 1 and 2 (see Figs. 1, 3, 35, 36, and 37) and have secured to their upper surfaces the guide-bars 11 and 12. Fastened to the guide-bars 11 12 are the ways 13 14, (see Figs. 1, 6, 8, 9, 12, 12½,) in which is mounted aluminium plate 15, having the steel shoes 16, and the sliding surface, Figs. 7, 8, 9, is caused to reciprocate by means of the bars 17, upon the ends of which are pivoted the eccentric-rods 18, which receive motion from the eccentric 19, mounted on a shaft 20, at the outer end of which is a pulley which receives motion through a belt 21, which passes around the idlers 22 23 and receives motion from a pulley 24, secured to the end of the driving-shaft 25, which rotates in bearings 26 on beam 2, the said shaft 25 having secured thereto the loose pulley 27 and tight pulley 28, which receives power in the usual manner.

Secured to the aluminium plate 15 is a frame of tin or other metal which has the partitions spaced apart a distance of about one-half the length of a match. This construction is called by match-makers a "shaker," and therefore I will call it by that name in referring to it. The sides and one end are higher than the inner partitions, and in one end of the plate 15 is a cut or recess in which the bar 17 is placed and secured by means of a countersunk head-bolt 29, as seen in Fig. 11. The plate 15 is held in the ways 13 and 14 by plates 30, which are independent of guideways 13 14, so that on account of the wear which will take place on the steel plates 16 the shaker can be removed and paper, tin, or any other suitable material placed between plate 16 and plate 15 to take up necessary wear without disturbing any other part of the machine.

31 designates a false match-box partitioned the same as the shaker and having the partitions extending above the sides of the box equal to the thickness of match. (See Figs. 16 and 17.)

32 designates a plate having the sides beveled at an angle of forty-five degrees and having rib-lugs 33, the false box 31 being securely fastened upon the plate 32 in any suitable manner.

34 designates a frame securely fastened upon links 35, which are connected together by means of shoulder-bolts 6, the head of which is adapted to mesh and rotate around the sprocket-wheels 37 and 38, suitably mounted on the frame. (See Figs. 14, 15, 16, 1, and 2.) The outer link 35 is loosely pivoted on shoulder-bolt 36, which is securely fastened by nuts to the inner link 35.

39 designates gibs which are fastened to the frame 34 and form guideways for the plate 32 when the same moves in a lateral direction.

40 designates a movable bridge which is adapted to be raised at a certain time and bridge the distance between two false boxes while the same are being filled and at a certain time are lowered after said boxes have been filled, said bridge 40 having raised partitions similar to those on the false boxes 31 and shaker.

41 designates the frame which supports the bridge 40 and upon which it moves in a lateral direction in conjunction with the false boxes 31, the same being accomplished by means of the lugs 42, which extend over the ends of the false boxes 31 and are fastened to the bridge 40.

43 designates a shoulder-rod securely riveted to 41 and having a spring 44, held by a nut 45, (see Figs. 27 to 30,) the object of spring 44 being to hold the bridge in its normal position, as seen in Fig. 14.

46 designates bars which are securely riveted to 41, having holes 47 therethrough, in which are placed pins 45, upon which rotate rolls 49.

50 designates the guideways of the bars 46, said guideways 50 being secured to or forming part of the frame 34.

51 designates a shaft upon which is securely fastened a sprocket-wheel 38 and guide-wheels 52, said shaft 51 rotating in suitable bearings on the beams 1 and 2.

53 designates rocker-bars which are caused to reciprocate in a lateral direction by means of eccentric 54, connected with an eccentric-rod 55, which agitates the slides 56, to which is fastened the shoulder-bolt 57, the other side of which is loosely pivoted to the rocker-bars 53.

58 and 59 designate guideways for the slides 56 and which are bolted to the under side of the guide-bars 11 and 12.

60 designates a side extension of the guideways 58, at the outer end of which is securely fastened the shoulder-bolt 61, which forms a guide pin or way for the rocker-bar 53. The hole in rocker-bar 53 is slightly elongated, as seen in Fig. 25 at W.

62 designates a bar which is securely bolted at either end to the slides 56 and forms a connection between the two rocker-bars 53.

63 designates the lifting-bars which elevate the bridge 40 to the proper height by means of the roller 49, the shoulder-bars 46, and frame 41, said bars 63 being bolted to the slide 58.

64 designates a shaft upon which is securely fastened the eccentrics 54 and driving-pulley 65, which derive power from a belt which passes over idler-pulleys 66 and 67 and driving-pulley 68, which is fastened onto the driving-shaft 25.

69 designates the bracket-bearing in which rotates the shaft 64, said bracket being secured to the side of the guide-bar 12.

70 designates a bracket secured to the beam 2 and which supports in any suitable manner the idlers 66 and 67, as seen in Fig. 1.

71 designates a deflecting or guiding bar secured to the upper surface of support 10, and said bar is engaged by the lugs 33 of the false boxes and causes the latter to move to the center between the guide-bars 11 and 12, so that the lugs 33 are directed to the guide-wheels 72. The deflecting-bar 71 guides the false boxes on the guide wheel or disk 72, which is securely fastened on the shaft 73, upon which is also secured the sprocket-wheels 37, said shaft 73 rotating in suitable bearings, which are bolted to a stand 74, which is secured to the beams 1 and 2.

75 designates angle-bars which are securely bolted to the stand 74, and 76 designates angle-pieces which are securely bolted to the angle-bars 75, and on the outer ends of the angle-pieces 76 are bolted the straight bars 77, to which are securely bolted the circular plate or bar 78, which is bent to form a segment of a circle with a radius conforming to the outer side of the false box 31, having upon them in reversed position the match tray or boxes and tends to keep them in their proper position until they have arrived at their lowermost point of the circle in which they rotate, when gravity causes the matches and trays to leave the false boxes 31, the matches now being in the trays, as best seen in Fig. 33. The chain of false boxes, links 35, &c., now continue to slide on and are supported by the guide-bars 79, which are curved, as seen in Fig. 1, and are securely bolted at one end to the bracket 80, which is supported by the stand 10. The guide-bars 70 are bolted at substantially the center to the bracket 81, which is securely bolted on the support 9, which also carries the bracket 82, which supports the idlers 22 and 23. The guide-bars 79 are bolted at the other end to the beam 83, which is mounted on the under side of the beams 1 and 2. Bolted to the guide-bars 79 is the bracket 84, which carries the deflecting-bar 85, which guides the false boxes to the guide-wheel 52, as seen in Figs. 38 39 40.

86 and 87 designate two shafts on which are securely fastened the sprocket-wheels 88 and 89, which rotate in suitable bearings secured to the beams 3 and 4.

90 designates links which are connected by the shoulder-bolts 91, similar to links 35 and bolts 36, and are adapted to pass around and mesh with the sprocket-wheels 88 and 89.

92 designates plates securely fastened at either end to the links 90 and have lugs 93, which project upward and between which the match-tray and matches are caused to be placed, as seen in Fig. 33.

94 designates a cut-away portion one-half of the height of the lug 93 and in which extends the lower end of the circular bar 78, which supports the match-trays at a certain time.

It will be noticed that the inside of the lugs 93 have a circular bevel which permits of the easy entrance of the match-tray, the forward motion continuing until the matches and tray have dropped between the lugs 93, as seen in Fig. 33.

95 designates two tracks or bars which are securely fastened to the plate 92, on which run the rollers 96, which are loosely pivoted on the eccentric sleeves 97, which are bolted to the sides of a pusher 98. The pusher 98 has two arms, which are loosely pivoted to the sliding block 99, on the under side of which is fastened a plate 100 by means of the shoulder 101, which also acts as a pin or pivot, on which rotates a roller 102, said roller 102 moving in a slot, which will be hereinafter described. On the lower side of the pusher 98 extends a lug 103, carrying a double eccentric stud 104 by means of the cap 105, said stud having loosely mounted therein two rollers 106, which are held in place by a washer and nut in the usual manner, as seen in Fig. 59. To the pusher 98 is securely fastened a spring-steel blade 107, while in plate 92 is a slot 108, through which extends the lugs 103 and the lower part of the block 99. On either side of slot 108 and below the tracks 95 is a groove slightly wider than the rollers 106, (see Fig. 59,) as deep as the height of the track 95, and also slightly longer than said track 95, the ends of said groove being bevel, as seen in Figs. 45 and 47.

Referring to Fig. 45, it can be plainly seen that by turning down the largest half of the eccentric sleeve 97 it will raise the front end of pusher 98 and also the steel blade 107, and by turning the smaller half down it will lower 98 and 107, the proper position of blade 107 being shown in Fig. 48. In this figure the sliding block 99 has been pushed forward, as will be hereinafter described. Continuing the forward motion of the sliding block 99, as shown in Fig. 49, it will be seen that when the roller 96 has passed half-way down the bevel at end of track 95 the end of the blade 107 will have passed the top of the match-tray and moved downward until it clamps or touches the top of the tray and matches in same. Continuing the forward motion of block 99, as shown in Fig. 50, it will be seen that the blade 107 now clamps or touches the tray and matches along the entire top of the same. The roller 106 coming to the bevel at end of the groove will pull the end of the pusher 98 downward, the roller 106 now running on the level surfaces on the bottom of plate 92, the bending of the steel blade 107 taking place at V, Fig. 50.

Referring to Fig. 54, it will be seen that the rollers 106 are easily adjusted by means of eccentric studs 104, and by turning the stud 104 either upward or downward the clamping of the matches and trays can be regulated at will.

In Fig. 58 it will be seen that the plate 100, which is fastened to the plate 99, is wider than said block 99, so as to clear the grooves on either side of the slot 108.

109 designates a frame, which is secured to the bottom of the plate 92, having grooves 110, in which the funnel-bars 111 are caused to slide. On the back of the funnel-bars 111 are the bosses 112, which extend through the openings 113, and in the back of the frame 109 is a vertical groove, in which the bar 114 is caused to slide, it being held in place by the straps 115. On the bar 114 is fastened a shoulder 116, on which are loosely pivoted the bars 117 and 118, the outer ends of which are loosely pivoted on the shoulder-screws 119, which are screwed in the bosses 112 of the funnel-bars 111 after said bars 111 are placed in grooves 110, the bosses 112 extending through the opening 113. In Fig. 76 the shoulder-screw 119 and bar 117 are removed, the bar 118 being bent so as to bring the two ends of 117 and 118 on a line, as can be seen in Fig. 77.

120 designates screws on which are loosely pivoted the funnel-bars 121, in which are the slots 122, in which operate the pins 123, which are fastened to the funnel-bars 111.

124 designates a strap which keeps the funnel-bars 121 in their proper position.

125 designates the two upper quarters or plates of the funnel. It will be seen that they are made to have the forward half of both top and side at a bevel, so as to admit easily and guide the steel blade 107 and box containing matches in the tube, said tube being placed over and outside of the straight ends of the funnel. (See Figs. 97 to 102, inclusive.) The funnel-plates 125 are securely fastened to the funnel-bars 111 by means of rivets, soldering, or in any suitable manner.

126 designates the two lower quarters or plates of the funnel and are similar in construction to the funnel-plates 125 and are fastened to the bars 121 in the same manner as funnel-plates 125 and slide-bar 111.

127 designates a bolt on which is loosely mounted the roller 128. It will be noticed that if pressure is exerted in an upward direction on roller 128 it will cause the four quarters of the funnels 125 and 126 to move outward simultaneously and with them a tube after the same has been placed thereon to its utmost, so as to allow the easy admittance of the blade 107 and the match tray or box, as seen in Figs. 94, 95, 96.

129 designates two clamps having an angle extension at their ends, to which is loosely secured the plate 130, which has elongated slots in which the screws 131 are caused to slide, the length of the slots in plate 130 determining the distance to which the clamps 129 can be opened or closed, it being noticed that the clamps 129 have corrugated surfaces or teeth extending part way on the inside thereof. It will be noticed that the lower end of clamp 129 extends inward and terminates in a part of the segment of a gear, the clamps being pivoted at X, and that the parts must move inwardly or outwardly in unison.

132 designates the forks upon which the clamps 129 are pivoted, the shoulder-screws 135 going through the forks 132 loosely and are secured in the extension of the clamp at X, the fork 132 preventing the clamp 129 from separating.

133 designates an extension-tongue of the fork 132, which slides loosely in the guide 134, said guide being fastened to the plate 92.

136 designates supporting-guides which are secured to the outer ends of the clamps 129 and are for the purpose of supporting and guiding the clamps 129 as the plate 92 moves.

137 designates a roller loosely mounted on the bolt 138, which is secured to the under side of the forks 132, said forks 132 having a boss or hub extending downward, as seen in Fig. 45, and to which is secured the bolt 138.

139 designates a slide which moves in a line parallel with the motion of clamp 129, fork 132, and tongue 133 by means of ways 140. On the slide 139 are secured the bolts 141, to which are secured the springs 142, which are also pivoted to the bolts 143, secured at the outer segmental ends of clamps 129.

144 designates a roller loosely mounted on the bolt 145, which is secured to a boss or hub extending down from said slide 139.

146 designates guide-bars in which move the endless chain of plates 92, and in referring to the endless chain of plates I mean all the parts and mechanism as seen in Figs. 45 and 46.

147 designates the brackets to which are securely fastened guide-bars 146, said brackets 147 being secured to beams 1 and 2, which also carry a bracket 148.

149 designates a bracket secured to the top surface of 148 and supports and has secured to it the guide-slot 150 in which moves the roller 102.

151 designates a bracket secured to the top surface of the bracket 148 and supports and has secured to it the guide-slot bar 152. This bar has two slots 152ˣ and 153, the slot 153 extending but part way, as seen in Fig. 86, and in slot 152 moves the roller 137, while in the slot 153 the roller 144 is adapted to move.

154 designates a bar which is fastened to the top of the bracket 148, and secured to the top thereof and extending over one side is a plate 155, so that when the roller 128 in its movement impinges against the end of the plate 155, which is beveled or inclined, it pulls on the roller 128 and with it the bar 114, which moves downward and causes the funnels 125 and 126 to close, as seen in Figs. 94 and 68. As the movement of the roller 128 continues and leaves the plate 155 it impinges upon an inclined raised portion on the bar 154, which is in its line of movement and causes the bar 114 to move upward, as will be hereinafter explained, and cause the funnels 125 and 126 to move outward simultaneously, the movement of the roller 128 continuing at a predetermined point, at which the bar 154 is inclined downward and also ends. (See Figs. 91, 92, and 93.)

156 designates a bracket which is supported by the beam 2 and has secured to it the guide-slot 150, and the bracket 157 is supported by the beam 1 and has secured to it the guide-slot 152.

158 designates a guide-wheel secured to shaft 86 and is in line with and at the end of the guide-slot 150 and guides the roller 152 in rotating around the said shaft 86.

159 designates a guide-wheel secured to shaft 86 and is in line with and at the end of guide-slot 152 and guides the roller 137 in rotating around said shaft 86.

160 designates guide-bars supported on brackets 161 on the lower side of the machine, in which slide and are guided endless chain of plates 92.

162 designates a bracket similar to 149, secured to the under side of bracket 148, and to which is secured the guide-slot 163, which is similar to guide-slot 150 and in which move rollers 102 when in a reversed position or when the same are on the under side of the machine.

164 designates a bracket similar in construction to 149 151 162 and which is secured to the under side of the bracket 148 and which supports the guide-slot bar 165, which has two slots 165 and 166 therein, the slot 166 extending but part way, as can be seen in Fig. 87, and in the slot 165 moves the roller 137 and in the slot 166 the roller 144 when the said rollers reach said slots during the movement of the plates 92.

167 designates a bracket which is secured to beam 4 and which supports and has secured to it, at the angle therein, the slot-bar 163, said slot 163 being in a reversed position from bar 150. (See Figs. 86, 87, and 89.)

168 designates a bracket which is secured to beam 3 and which supports and has secured to it at the angle the slot-bar 165, (see Figs. 87 and 90,) it being noted that 156, 157, 167, and 168 are similar in construction.

169 designates a guide-wheel which is securely fastened to shaft 87 and which is in line with and at the end of guide-slot 163 and guides the roller 102 in rotating around the shaft 87, and 170 designates a guide-wheel which is secured to shaft 87 and which is in line with and at the end of guide-slot 165 and guides the roller 137 in rotating around the shaft 87.

It will be noted that the guide-slot 150, guide-wheel 158, guide-slot 153, and guide-wheel 169 form one continuous guideway for the roller 102, while the slot 152, wheel 159, slot 165, and wheel 170 form one continuous guideway for the roller 137.

171 designates a worm-gear securely fastened to the shaft 173 and which is driven by the worm 172, which is securely fastened to the shaft 173, said shaft 173 rotating in a bearing 174, which is secured to the beam 1. It will be noted that the bearing 174 is at the right-hand side of the worm 172. This is in the direction of the thrust of the shaft due to the resistance offered by the worm-gear to the worm 172.

175 designates another worm similar to worm 172, securely fastened to the shaft 173, said worm 175 driving the worm-gear 176, which is securely fastened to the shaft 86. To the right of the worm is also a bearing 177, in which rotates the shaft 173, the bearing 177 taking the thrust of the worm 175.

178 designates a gear securely fastened at the outer end of shaft 173. To the right of said gear 178 is a bearing 179, in which rotates shaft 173, said bearing 179 being secured to beam 1.

180 designates a collar for evident purposes.

181 designates a gear meshing with gear 178 and which is securely fastened to shaft 182, (see Figs. 3 and 43,) said shaft rotating in bearings 183, which are on the same bracket as 179.

184 designates a flanged drum which is secured to shaft 182, around which passes a belt 185, which also passes around a flanged conical drum 186 on the opposite side of the machine and which is fastened to the driving-shaft 25.

187 designates a roller having its periphery curved or U-shaped, against which contacts a side of the belt 185, which would naturally run over to the large end of the conical drum 186, but is prevented by said roller 187.

188 designates a bolt on which the roller 187 rotates. The bolt 188 is securely fastened to the slide 189, said slide 189 moving on the top of the beam 2 and held in position by the guideways 190. It will be noted that if the slide 189 is moved either to the right or left it will guide the belt on the conical drum 186, moving downward on the larger and upward on the smaller end thereof, so that the bolt 188 is made long enough to allow the roller 187 to move thereon to follow the upward or downward movement of the belt 185 as it moves up or down on account of the difference in diameter of said conical drum.

191 designates an extension on the under side of slide 189, which moves in the opening 192 in the beam 2 and which extends down, as seen in Fig. 107, said extension 191 having secured thereto a bolt 192, and loosely pivoted thereon is a bar 193. The other end of bar 193 is loosely pivoted on bolt 194, which is secured to the lever 195, the said lever being pivoted on the bolt 196 to the beam 4. (See Fig. 88.)

197 designates a guide for the lever-bar 195 and to permit of its free and easy movement, said guide being secured to the beam 2 by the bolts 198.

199 designates a handle of a bell-crank or angle lever 203, loosely pivoted by the bolts 200, which are carried in the brackets 201, which are secured to the lever 195 by the bolts 202. The other end of the angle-lever 203 is secured by the bolt 204 to the bar 205, the end of which extends into the rack 206, which is secured to the beam 2 by the bolts 207.

208 designates a guide-bracket for the bar 205, having a slot 209, which is slightly larger than the bar 205 and which is secured to the lever 195 by the bolts 210 at a slight distance above the rack 206.

211 designates a collar secured to shaft 73 to prevent any lateral movement of said shaft, (see Fig. 4,) and 212 designates collars secured to shaft 51 for evident purposes.

213 designates a match-tray which is preferably employed, and 214 designates a match-tube of the ordinary construction.

The operation is as follows: Matches are caused to drop upon the shaker at the places marked V V. (See Fig. 7.) It is preferable to cause the matches to drop, so that the heads will be at the rear of the splint, from a suitable chute or belt. Rapid reciprocating motion is imparted to said shaker (see Figs. 3, 5, 6, and 7) by means of the slide 15, bar 17, eccentric-rods 18, eccentric 19, and shaft 20, the pulley fastened to the shaft 20, around which is passed a belt 21, which passes around idlers 22 and 23 and around pulley 24, to which motion is imparted by shaft 25, having the tight pulley 28, around which passes a band or belt in the usual manner and which drives the entire machine. The rapid reciprocating motion and inclined position of the shaker causes the matches to slide toward the discharge or lower end thereof. (See Figs. 1 and 6.) The partitions of the shaker, which are narrower than the length of a match, cause the match to lie or slide lengthwise, cross-matches being impossible. Passing underneath of the shaker is the endless chain of false boxes, connected by the links 35 and bolts 36. This chain is caused to slide in the guide-bars 11 and 12. (See Figs. 1, 10, 22, 23, and 35.) The false boxes are divided into partitions similar to the shaker (see Fig. 17) and are secured to the sliding plate 32, which slides or reciprocates upon the frame 34, which is secured to the top of the links 35, which form an endless chain or belt. Under the plate 32 are the lugs 33. Between these lugs passes the bar 62. (See Figs. 20, 21, and 22.) A lateral reciprocating motion is imparted to the bar 62, as will be hereinafter explained, which causes the slide 32 to reciprocate, and consequently the false boxes. This motion causes the matches to pack closely and parallel in the false boxes 31. When the first box is full, the bridge 40, having been raised to a level of the false boxes, (see Figs. 14 and 29,) as will be hereinafter explained, causes the matches to slide into the next box as long as the matches are fed to the machine and reciprocating motion continued or kept up. The bridge 40 has ridges or partitions similar to the shaker and false boxes and reciprocates with the false boxes 31 by means of the lug 42, as can be seen in Figs. 14, 16, 19, 29, 30, and 32. The reciprocating bar 62 is secured at both ends to a raised part of the slide 56, which moves in suitable guideways 58. (See Figs. 21, 22, 20, and 1.) Said guideways 58 are secured to the under side of the guide-bars 11 and 12, and motion is imparted to the slides 56, one of which is left and the other right hand, (see Figs. 21, 20, 22, and 1,) by the eccentric-rods 55, eccentrics 54, secured to shaft 64, rotating in the bearings 69, which are secured to the side of the guide-bar 12. Secured to the shaft 64 is a flange-pulley 65, around which passes a band or belt, (not shown,) said belt also passing around idlers 66 67, rotating upon suitable bolts secured to brackets 70 and around the guide or pulley 68, mounted on the shaft 65. (See Figs. 1, 3, 21, 20, 22, and 23.) On the outer guideways 58 are lugs or tongues 60, which extend outward (see Fig. 26) and have pivoted at their outer ends the bars 53 by means of the bolt 61. The other ends of the bar 53 are pivoted on the raised part of the guide 56 by means of bolts 57. The end pivoted on slide 56 is round and conforms to a radius the center of which is bolt 57. The end of the bar 62 also conforms to this radius and the other end of the bar 53 is tapered. (See Figs. 21, 24, 25, 26, and 20.) This taper is such that when the slides 56 are at their farthest throw the tapered ends of the bar 53 are on a line with the side of guide-wheel 52. As the chain of false boxes rotates around the sprockets 36, which is secured to shaft 51, to which is also secured guide-wheel 52, said guide-wheel 52 passes between the lugs 33 of the false boxes and guides the same to the bar 53. As the lugs pass the bolts 61 they begin to reciprocate gradually, and when they pass to the bar 62 they receive the full movement. This continues the full length of the bar 62, or until the boxes 31 pass the bolt 57 and to the bar 53. Then they begin to reciprocate less and less until the bolt 61 is passed and the movement ceases. (See Figs. 1, 21, 20, 22, 25, 43.) On account of the radius of the bars 53 and 62, as can be seen, they form one unbroken line for the movement of the false boxes. (See Figs. 21 and 25.)

On referring to Fig. 1 it will be noted that the chain of false boxes 31 begin to reciprocate as soon as they leave the guide-wheel 52 and the full reciprocating movement beginning at the center of lower eccentric and continuing until the boxes have passed under the discharge end of the shaker, after which the boxes move less and less until lateral movement stops or ceases. It will be further noted that the eccentrics 54, one of which is seen in Fig. 22, are so secured on the shaft 64 as to cause the slides 56 and bars 62 to reciprocate in unison, which construction can best be understood in Fig. 21.

Secured to the guideways 58 and at either side of the bars 53 are the bars 63, (see Figs. 20, 21, and 22,) the tops of which are beveled or inclined, Figs. 20 and 29, and the purpose of which is to raise the bridge 40 (see Figs. 14, 18, 19, 29, 30, and 32) and hold the same in elevated position.

41 designates a frame, (see Fig. 18,) upon which the bridge 40 is mounted and caused to slide, and which frame 41 is raised and lowered by the rollers 49, hereinafter referred to, contacting with the bar 63, it being noticed that the bridge 40 is carried with said frame. It will be noted that the bridge 40 is recessed on the bottom sides, and said recesses form the guideways or slides which move on the frame 41. (See Fig. 18.) It will also be noted in Fig. 16 that the lugs 42 extend over the ends of the false boxes, and as the bridge moves loosely on the frame 41 it will move in unison with the false boxes when motion is imparted to the false box 31. The frame 34, Fig. 17, has two extension-pieces in which are holes adapted to receive the pins 46, which can move in said holes to permit the frame 41, Fig. 18, to move up and down. The outer bar 43 of the frame (see Figs. 18, 27, and 28) is screw-threaded at its lower end and carries springs 44, which are held in place by a nut 45. (See Figs. 29 and 30.) The said springs 44 pressing on the under side of the frame 34 and on the nut keep the frame 41, Fig. 18, and bridge 40 in their normal positions. (See Fig. 14.) The aforesaid extensions of flange-pieces of the frame 34 are milled away to leave the lugs or guides 50, as seen in Figs. 17, 29, 30, 31, and 32. When the frame 41 and bars 43 and 46 are placed in the holes of the extension of the frame 34 before the spring and nut are put on, a roller 49 is placed between the bars 46 and lugs or guides 50, and a pin 48, Figs. 28, 32, is placed through the bars in holes 47, Fig. 18, and through the roller 49. The ends are then riveted and bent over to prevent some from coming out. The spring and nut are then placed in position. It is plainly evident that if the rollers 49 are pushed up simultaneously they will move up the bars 46 and the frame 41 and of course the bars 43, the spring 44 resisting.

Referring to Figs. 20, 21, 22, it will be seen that as the chain of false boxes leaves the sprocket-wheel 38 and slides in the guide-bars 11 and 12 the lifting-bars 63 are so placed that the rollers 49 impinge against the inclined surface of the bars 63. As the motion of the chain continues this pushes upward on the rollers 49 and raises the bridge until level with the top of the false boxes. (See Figs. 29, 22, and 20.) The top of the bar 63 is on a line with the bars 11 and 12 and keeps the bridge in elevated position until it passes under the discharge end of the shaker, when it inclines downward until the bridge is again in its normal position. (See Figs. 6, 20, 29, 30, 32.) It will be noted that the guideways 50 extend a slight distance below the bar 46. This is to give a long bearing to the bar 46, and when the roller 49 impinges against the incline of the bar 63 it prevents it from binding and breaking off. (See Figs. 17, 20, 31, and particularly Fig. 32.) It will also be noted that the bridge and frame 41 rest upon the frame 34 when in a normal position on account of the shoulder of the bars 46. (See Figs. 32 and 14.)

Referring to Figs. 1 and 3, there will be seen the speed-regulating device, cone-drum 186, by which the speed of chain of false boxes is increased or decreased, as will be hereinafter explained, the speed of the mechanism driven by the wheels 68 and 24 remaining the same. The matches are fed from any suitable source of supply into the shaker, and as the same is inclined, as well as the false boxes, the matches move downwardly from said shaker and into said false boxes, and as the shaker and false boxes and bridges all reciprocate the matches are assisted in their descent, the partitions presenting cross-matches, and it will be readily seen that when the false box is filled the surplus of matches will pass to the next one, and so on. When the matches are first fed to the machine, the speed of the chain of false boxes is at its lowest. This speed is allowed to remain until the matches have filled the false boxes half-way between the discharge end of the shaker and the lower end of the guide-bars 11 and 12. (See Figs. 1, 3, and 13.) Counting upward from the box A will be found the proper place. The speed of the chain of false boxes is now increased, so as to maintain, if possible, this place at which it is desired that as each box is filled another one takes its place. As the supply of matches is variable, one minute increasing and the next minute decreasing, this place of filling will not be maintained, but will be constantly changing. Now if the decreasing supply of matches continues for some time it will be noted that the chain of false boxes will pass under the shaker without being perfectly full. When the operator notices that this is liable to happen, he decreases the speed of chain of false boxes by means of the speed-regulating device until the boxes are again filling at the aforesaid place. Again, if the increasing supply of matches is continued the false boxes will be filled even up to the box A, when the oversupply of matches would be spilled or lost, so that when the operator notices that the boxes are being filled at the lower end of the guide-bars 11 and 12 he increases the speed of the chain of false boxes until they are again filling at the aforesaid proper place, when he sets the regulating device so as to in his judgment keep the filling at this place. The operation of the regulating device will be hereinafter explained. It can be easily seen from the above explanation that the filling is semi-self-regulating, and only in extreme variations of the supply of matches is it necessary to operate a speed-regulating device, and also, unless the operator is negligent, that every box must be filled to the utmost capacity. When the false boxes are filled and passed under the shaker, they continue on the guide-bars 11 and 12 until they come to the deflecting guide-bar 71, when if the boxes have moved out of the center they are caused to move so that the bar 71 will pass between the lugs 33 and be guided to the guide-wheels 72, secured to the shaft 73, (see Figs. 1, 2, 3, 53, 42, 41,) the guide-bar 71 being secured to the top of the support 10. The chain of false boxes rotates on the sprocket-wheel 37, secured to shaft 73, which rotates in a suitable bearing secured to the top of the stand 74, said stand 74 secured to the top of beams 1 and 2. (See Figs. 2, 4, 34.) Upon the chain of false boxes from B to C are now placed in an inverted position match boxes or trays, (see Figs. 1, 2, 33, 117,) the operator first placing the trays upon the boxes C and continuing to the box B. This is on account of the forward motion of the boxes. As the chain of false boxes rotate around the sprockets 37 the inverted trays 213 contact with a rigid plate 78, which is secured to cross-bars 77, which are in turn secured to angle-pieces 76, these again to angle-bars 75, and these in turn secured to the stand 74. (See Figs. 2, 4, 33, 34.) The plate 78 allows the tray to slide around and keeps it on the false boxes, and consequently prevents the matches from falling out. The circular motion of the chain of false boxes continues until the trays 213 have arrived at the end of the plate 78. The forward end of tray 213 now drops between the lugs 93 of the plate 92, and the motion continues until the back end of tray 213 falls off of the plate 78 and between the lugs 93 of plate 92, as can best be seen in Fig. 33. The plate 92 constitutes a part of the chain, whose construction is somewhat similar to the chain of false boxes, as will be hereinafter explained. It will be noted that the matches are slightly shorter than the false boxes, and also the tray is slightly larger than the false boxes. Thus it is evident that as the trays are inverted at the top of the sprocket-wheel on turning, it will bring the tray in a proper position, and when in its lowermost position the plate 78 no longer supports the tray the tray and matches drop from the false boxes, and as the trays are in proper position of course the matches are now in the tray, as plainly seen in Fig. 33. The chain of false boxes and the lower chain move in unison, and the chain of false boxes are now caused to move upward on an incline to the upper surface of the curved slide-bars 79, thus leaving the matches and trays in the lower chain, as seen, Fig. 23. The chain of false boxes which are now inverted are caused to slide on the curved slide-bars 79, which are secured by brackets 80 to the support 10. (See Figs. 1, 21, and 35.) The bars 79 are again supported near their center by brackets 81, secured to support 9. (See Figs. 1, 36.) The bars 79 are supported at the other end by beam 83. (See Figs. 1 and 38.) Secured to the sides of the bars 79 is a bracket 84, to the under side of which is secured deflecting guide-bar which guides the false boxes to the guide 52, which in turn guides the false boxes to the pivoted reciprocating bar 53, as explained, the chain of false boxes rotating around the sprockets 38. (See Figs. 1, 3, 43.)

I have thus far explained the method of filling the trays. It can be seen that the matches are self-straightening; that the boxes must all be filled to their utmost capacity; that the machine is semi-self-regulating, but can be filled by the operator; that the false boxes are spaced apart; that the rising and falling bridge makes a plain and simple communication between the said boxes, and that the spacing apart of the boxes facilitates the placing of the trays upon the false boxes, the lowering of the bridging not impeding the placing of said trays.

The construction described, which permits a plurality of trays to be placed upon the false boxes, the inverting of false boxes containing matches and tray, which inversion causes the matches to fill and lie in the tray, and the raising of the chain of false boxes to leave the matches and tray upon a lower chain, also the sliding of the chain of false boxes upon curved sliding bar 79, which lifts up the said chain of false boxes to permit of further mechanical movements relative to sliding a tray of matches into the tube or covering for said tray of matches and guiding the chain of false boxes to the smaller sprocket-wheel, completes an endless and continuous method of filling match-boxes.

Having explained the method of filling boxes, I will now explain the method of sliding the filled match-tray into the tube.

Referring to Fig. 47 will be seen a plate 92, having the beveled raised lugs 93, between which the match-tray is placed, as seen in Fig. 33. A recess 94 is cut in these lugs to permit the ends of the plate 78 to be as close as possible to the surface of plate 92. (See Fig. 33.) Secured to the top of plate 92 and to the right of lugs 93 are the tracks or bars 95, one end of which is beveled or inclined. Upon these tracks run the rollers 96, which are pivoted on bolts secured to a pusher 98. (See Figs. 45, 46, 52, and 57.) The pusher 98 has a lug extending downward and which slides in the slot 108 in plate 92. (See Figs. 47, 51, 52, 59.) Secured to the under side of the lug 103 of the pusher 98 is a cap 105, which clamps and securely holds a double-eccentric stud 104, upon the ends of which rotate the rollers 106. (See Figs. 52, 54, 59.) The pusher 98 has two arms, which are loosely pivoted to a sliding block 99. Said sliding block 99 has a tongue which extends through the slot 108 and has secured to it the plate 100, which is recessed to fit the tongue and is secured by the bolt 101, on which also rotates the roller 102. (See Figs. 45, 46, 57, 58.) On either side of the slot 108 and on the under side of the plate 92 is a groove which is slightly longer and in depth equal to the height of the tracks 95. In this groove are caused to slide the rollers 96. (See Figs. 45, 47, 57, 59.)

On referring to Fig. 45 it will be seen that if the roller 102 be pushed from right to left it will carry with it block 99, pusher 98, rollers 96 and 106, and the spring-steel blade 107, which is secured to the top of the pusher 98. (See Figs. 45, 46, 57.) In Fig. 45 it will be noted that the roller 96 rests on the track 95 and the roller 106 extends up into the groove on the under side of plate 92 and also that the plate 100 extends beyond the said grooves, as seen in Fig. 58.

Secured to the under side of the plate 92 and to the left of the lugs 93 is a frame 109, upon which operates the funnel-plates 125 and 126 of the funnel. (See Figs. 45, 46.) In Figs. 72 and 73 will be seen, perspectively, front and back views of frame 109. In the grooves 110 are caused to slide the funnel-bars 111. To the upper ends of these bars is secured a plate. (See Figs. 79 and 80.) The shape of the funnel can be seen in Figs. 83, 84, and 85. In certain views I have omitted the taper of the funnel to prevent confusion and show more plainly the method of operation. On the funnel-bars 111 are two lugs or bosses 112, which extend through the openings 113 in the frame 109. (See Figs. 72, 73, 74, 79, 80.) To these lugs 112 are pivoted, by means of the screws 119, the links 117 and 118. The other ends of links 117 and 118 are pivoted to the bolt 116 near the center of the bar 114. On the lower end of bar 114 is the roller 128 on the bolt 127. (See Figs. 75, 77, 79, 80.) The links 118 are bent, as seen in Fig. 76, to bring the ends pivoted on bolts 119 on a line with the lugs 112 of the bars 111 when they extend through the openings 113. (See Figs. 76, 77.) The bar 114 slides in a vertical direction in the groove on the back of the frame 109 and is kept in place by the straps 115, Figs. 73, 74, 77. On the front face of the funnel-bars 111 are secured the pins 123. These pins move in the slot 122 of the pivoted funnel-bars 121. The funnel-bars 121 are pivoted to the front face of the frame 129 by means of the screws 120. As these bars cross each other, their construction can be seen in Fig. 81. The bars 121 are kept in their proper place by the strap 124, the bars 21 acting as straps to keep the bars 111 in place. (See Figs. 68, 69, 70, 71, 78, 79, 80.) The funnel-plates 126 are secured to the tops of bars 121, as seen in Fig. 81, similar to funnel-plates 125. (See Figs. 83, 84, and 85.)

Referring to Figs. 68 and 69, it is seen that if an upper pressure is exerted on a roller 128 it will carry with it the bar 114. As the links 117 and 118 are pivoted on this bar and also at their outer ends to the funnel-bars 111 and being in the position as seen in Fig. 75, it will cause the bars 111 to move outward, and the pins 123, moving in a slot 122, will cause bars 121 to move down and outward, the movements of the four plates or quarters 125 and 126 of the funnel being in four different directions at substantially an angle of forty-five degrees simultaneously, separating the funnel-plates 125 and 126 for a purpose to be hereinafter explained, the downward movement of the bar 114 being to make the funnel-plates contract and become smaller and the upward movement vice versa. (See Figs. 68 and 69.)

Near the left end of the plate 92, Fig. 46, are arms 129, which form a clamp which slides on the top of plate 92. The construction, best seen in Fig. 60, shows ends extending over the edge of the plate 92, the ends beneath said plate extending at right angles to the length of the arms. These extensions have at their ends teeth similar to a gear and mesh with one another, the hole X being the center of movement, and the arms are recessed to permit them to slide on plate 92. (See Figs. 60 and 63.) Near the end of the arms 129 are teeth or corrugations which grip any material placed between them and the purpose of which will be hereinafter explained. The ends of the arms 129 are bent at an angle and have loosely secured to them the guide-plate 130. (See Figs. 44, 45, 46, and 60.) The screws 131 are secured to the ends of arms 129 and slide loosely in the elongated slots in the bar 130, the length of the slots determining the distance to which the arms 129 can open or close. (See Figs. 44, 60, 60½, and 62.) Secured to the sides of the arms at ends near said bar 130 are slides 136, the object of which is that when the plate 92 is in a reversed position it supports and guides the arms 129. (See Figs. 44, 45, 46, 62, 65, 111 to 114, inclusive. In these views Figs. 65, 111 to 114, inclusive, are in reversed position.) The arms 129 are kept in position and prevented from spreading apart by the fork 132 and are loosely pivoted in the holes of the fork 132 by means of bolts secured in holes X of arms 129, (see Figs. 60 and 61, also reversed Figs. 65 and 111 to 114, inclusive,) said fork 132 being adapted to slide the arms 129 lengthwise on the plate 92, as will be hereinafter explained. In this space, formed by forks 132 and the extension of arms 129, is placed the guideway 140 and the slide 139, said slide 139 having a boss similar to fork 132, and upon said boss is secured the bolt 145, upon which rotates the roller 144. Secured to the slide 139 are the two bolts 141, upon which are pivoted the springs 142, the other end thereof being pivoted on similar bolts 143, secured to the end of the arm 129, near the ends where the teeth mesh, said bolts 141 and 143 being in a line with the length of the plate 92. (See Figs. 45, 46, 64 and reversed Figs. 65 and 111 to 114, inclusive.)

Referring to reversed Fig. 65, it will be seen that if the slide 139 be moved to the right it will cause the arms 129 to close, (see Fig. 112,) and if moved to the left it will open said arms 129, (see Fig. 114,) said forks 132 being held in a fixed position during these positions of the slides 139, as will be hereinafter described.

The plate 92 is secured at either end to the top of links 90, connected by bolts 91, similar to links 35, and bolts 36. This chain is much heavier in construction than the chain of false boxes. (See Figs. 44, 45, and 46.)

Having now described the mechanism on plate 92, and as said plates are connected together by means of links 90 and bolts 91, forming endless chain or belt, I will refer to said plate 92 and mechanism contained thereon as the chain of sliding mechanism, meaning that this mechanism will slide the tray of matches within the tube or cover, and I will also explain fully the various movements and uses of the mechanism which I may have failed to do when designating the said parts and plate 92.

Referring to Figs. 33, 34 will be seen the relative positions of the chain of false boxes and chain of sliding mechanism. It will be noted that the chain of false boxes 31 extends a slight distance into and between the lugs 93 of the plate 92. The chain of sliding mechanism moves in guide-bars 146 and 160, which are placed between sprocket-wheels 88 and 89. (See Figs. 1, 2, 3, 4, and 89.) Referring to Fig. 89 will be seen a guide-slot 150, in which moves the roller 102, which operates the pusher 98 and blade 107, as will be explained. In this figure is also seen the guide-slots 152 and 153. In slot 152 moves the roller 137, which operates the fork 132 and arms 129, and in slot 153 moves the roller 144, which operates the slide 139 and which movement causes the arms 129 to open or close, as will be explained. In this figure is also seen the bar 154, to the top of which is secured the plate 155, said plate 155 pulling down the roller 128, which causes the funnel-plates 125 and 126 to contract and said bar 154, which pushes said roller 128 upward and which causes funnel-plates 125 and 126 to expand, as will be explained. As the forward movement of the two chains causes the match-tray and matches to be placed on the plate 92, as hereinbefore explained, and when this has moved forward a distance of about two plates or lengths the roller 102 impinges or strikes against one side of the guide-slot 150, (see Figs. 4 and 86,) and as the forward movement of the chain of sliding mechanism continues, this causes the pusher and blade 107 to move forward, as seen in Figs. 4 and 48. In Fig. 48 it will be seen that the blade 107 extends over and at a slight distance above the tray containing matches and substantially parallel therewith. As the movement of chain continues it moves the pusher and tray to the position as seen in Fig. 49. In this figure it will be noted the roller 96 has now run half-way down the incline or tracks 95, which causes the end of the blade 107 to rest on top of the tray of matches, it being seen that the blade 107 is slightly longer than the tray. The movement of the chain continuing moves the pusher and blade to the position seen in Fig. 50, so that the roller 106 has passed from the groove and now runs on the under flat surface of the plate 92. This pulls the pusher and blade 107 down and causes the blade 107 to clamp and press the matches and tray substantially along the entire top of same, the spring-blade 107 bending slightly if necessary and taking place at V. It will also be noted that roller 96 leaves the track 95 previous to the roller 106 leaving its groove and running on the under side of plate 92. A plan view of this figure can also be seen in Fig. 98, showing the blade 107 over the matches and tray.

In Fig. 98 it will be noted that match-tube 214 has been placed by hand over the funnel-plates 125 and 126, said funnel 125 not being seen, and said funnel-plates having been expanded, as will be hereinafter explained, the forward movement of the chain of sliding mechanism continuing until the matches and tray and blades 107 have completely entered the tube, as seen in Figs. 99 and 100. The tube 214 is prevented from moving off of the funnel-plates by the ends of the arms 129, which are at an angle to the length of said arms 129, the object of the blade 107 being to hold the matches when the tray enters the tube and preventing the possibility of the tube touching one or two matches, which would move them and these move others, and they would bunch up and retard the entrance of the tray, or if force is used to push the tray within the tube it will cause them to ignite. When the blade and pusher have entered the tube, as seen in Fig. 100, the roller 102 has arrived at the end of the guide-slot 150. (See Fig. 86.) It guides the roller 102 to a guide-wheel 158, which keeps the blade and roller and pusher in position on rotating around the sprockets 88. (See Figs. 34 and 86.) When the plate arrives at the bottom of the sprockets, a guide-wheel 158 guides the rollers to a guide 163, similar in construction to guide-slot 160, (see Figs. 86, 87, 89,) the chain of sliding mechanism now sliding in the guide-bars 160. (See Fig. 89.) The movement of the chain continuing, the guide-slots 163, in which moves the roller 102, now pulls the blade from the tube and tray of matches, the arms having previously clamped the tube-tray and matches, as will be hereinafter explained, to prevent the tray from sliding out again with the blade should there be any inclination for it to do so, the guide-slot 163 pulling the blade and pusher out, as seen in Figs. 100 to 104, inclusive. When the roller 102 arrives at the bracket 167, (see Fig. 87,) the slot is now parallel with the movement of the chain and guides the roller 102 to a guide-wheel 169, (see Figs. 87 and 88,) which keeps the roller 102 in position and guides the said roller to guide-slots 150 and as the movement continues repeats the operation, as described. (See Fig. 8.) It will be noted that the guide-slots 150 and 163 and guide-wheels 158 and 169 form one continuous guide-slot for the roller 102 and is so constructed that the sliding movement of the pusher and blade is regulated relative to the movements of the funnels and clamps to accomplish the automatic sliding of the tubes, as will be hereinafter explained.

In explaining the operation of the funnel-plates 125 and 126 it will be noted in Fig. 97, which is a plan view of the plate in which the tray of matches has been deposited, as seen in Fig. 33, that the funnel-plates are contracted, as seen in Figs. 68, 94, and 122. This is to facilitate the placing of the tubes upon the funnel-plates, as seen in Figs. 94 and 122, the funnel-plates being inside of the tube. Referring to Fig. 97, it will be noted that the tube is but slightly over the ends of the funnel and is also placed between the arms 129, which is done by the operation. As the tray of matches is deposited upon plate 92 and is moving forward the arms 129 move the tube upon the funnel-plates, as will be hereinafter described. (See Fig. 98.) When the plate has arrived at a certain place, the funnel-plates are caused to expand, as seen in Fig. 69, and expanding the tube 214 to its utmost, as seen in Fig. 95, and thus permitting of the entrance of the match-trays and blade. (See Figs. 96, 98, and 99.) As seen in Fig. 97, the funnel-plates are contracted on account of the bar 114 being pulled down by the roller 128, as hereinbefore explained, which can be seen in Figs. 68, 89, 91, 92, the roller 128 being pulled down by the plate 155 and impinges on the incline Y, which is in its line of motion on the bar 154, (see Figs. 2, 86, 91, 93) and causes the bar 114 to move upward and of course expands the funnel-plates, as hereinbefore explained. When the roller 128 reaches the top of the incline Y, it runs parallel with the motion of the chain and keeps the funnels open until the tray and blade 107 have entered the tube, when bar 154 inclines downward and roller 128 leaves the same. The chain now rotates around the sprockets 88 and reverses the position of plate 92. When the funnel arrives at the point Z, Figs. 2 and 87, the arms 129 pull the tray and tube off of the funnel-plates, as will be hereinafter explained. The chain of sliding mechanism continues in its movement and rotates around the sprocket 89, and when plates 92 arrive at top the plate 155 on the bar 154, which is beveled or inclined downward, will cause the roller to pull the bars 114 down, which will contract the funnel-plates 125 and 126, as hereinbefore described. (See Figs. 2, 68, 86, 89, 91, and 92.) When the funnel has contracted, as stated, a series of tubes can now be placed on said funnels in rapid succession, similar to the placing of the inverted trays on the false match-boxes, as hereinbefore explained. In Figs. 2 and 4 can be seen the space and plates on which the tubes can be placed, as stated, the number being about equal to the trays, as hereinbefore stated. In Figs. 87 and 2, at the places marked Z, when the tubes and trays are pulled off the funnel-plates the bars 114 being in a reversed vertical position naturally move down and tend to keep the funnel-plates expanded, but in going around the sprocket 89 the position is reversed and the bars will naturally move downward and of course contact the funnel-plates, the bar 153 being beveled and inclined to pull them down in case any bar has not moved down voluntarily. There is no necessity for any movement of the funnel after the tray has been pushed in the tube, (see Fig. 100,) which is just previous to rotating around sprocket 88. Therefore the bar 154 ends here and is only necessary after the chain has rotated around the sprocket 89, ready for the placing of match-tubes on said funnel-plates 125 and 126, as hereinbefore explained. (See Figs. 1, 2, 4, and 86.)

In explaining the operation of the clamps I will again refer to Fig. 97. As hereinbefore stated, a tube having been placed upon the funnel-plates and between the clamps 129 the roller 137, which causes the fork 132, and consequently the arms 129, to slide on plate 92, is caused to move in slot 152, (see Figs. 86, 89.) As the chain of sliding mechanism is caused to move forward the roller 137 impinges against the walls of the slot 152, which has a slight angle therein at the bracket 157, Fig. 86, and moves the tube on the funnel-plates, as seen in Fig. 98. The position of the mechanism which operates the arms 129 can be seen in reversed Fig. 65. In Fig. 65 the fork and slide 139 are in the position shown relative to the position of the arms and tubes as shown in Fig. 97. In reversed Fig. 111 the fork and slide are in the position shown relative to the position of the arms and tube as shown in Fig. 98. The forward movement of the chain-sliding mechanism continuing, the guide-slot 152 guides the roller 137 to the guide-wheel 159, which is secured to the shaft 86, and as the chain rotates around the sprockets 88 the guide-wheel 159 guides the roller 137 to the guide-slots 165. (See Figs. 34, 86, and 87). In Fig. 87 it will be noted that a slot 166 runs parallel with the slot 165 for a short distance and the slot 166 moves the roller 144. It will be seen by the dotted lines that slot 166 diverges from the slot 165 for a very short distance and causes the slide 139 to move away from the fork 132, which is prevented from moving by the slot 165, as can be seen in Fig. 87. The position of the slide and fork can be seen in Fig. 112. The movement of the slide 139 causes the springs 142 to push the arms 129, which are pivoted on the forks, and as said forks cannot move in the direction of the slide 139, as explained, it causes the tooth or corrugated ends of the arms 129 to clamp or grasp the match tube or tray and matches, as seen in Fig. 101, and will prevent the blade 107 from pulling the match-tray with it on being withdrawn from the said tube, as hereinbefore explained. It is seen that the clamping takes place previous to the withdrawing of the blade 107. (See Figs. 101, 102). On referring to Fig. 87 it will be seen that the slots 165 and 166 run parallel a short distance in order to give the blade 107 time to withdraw. (See Figs. 101, 102.) The tube and tray are still on the funnel-plates, and as the arms 129 are still grasping tubes and tray the parallel slots 165 and 166 are inclined to the left, which causes the tube and tray to leave the funnel-plates, as seen in Fig. 103, while the position of the fork and slide 139 is as seen in Fig. 113. In Fig. 87, at the place marked Z, it will be noted that the slot 165 runs parallel with the motion of the chain of sliding mechanism, and as the tube and tray of matches are now off of the funnel-plates it is desired to loosen the grasp of the arms. This is accomplished by causing slots 166 to continue from the point Z to a short distance, and as the slot 166 is at an angle and slot 165 is now straight or parallel with the motion of chain it causes the slots 165 and 166 to converge and of course open the arms 129, as seen in Fig. 104. The position of the fork and slide 139, being seen in Fig. 114, the slot 166 ends here, there being no further use for it. Under the bracket 168 (see Figs. 87 and 4) a convenient conveyer or box (not shown) is placed to receive the box of matches which are ready to be conveyed to the packer, who packs them, as desired. As the plate 92 and arms 129 are reversed, it is plainly evident that on the arms 129 opening the full tray or tube will fall out. After dropping the box of matches the slot 165 continues straight a short distance, after which the slot 165 inclines to the right a slight distance and causes the roller 137 to move the fork, and consequently the arms 129, to the position as seen in Fig. 97, with which we started. The position of the slots 165 can be seen in Fig. 87. The slot 165 guides the roller 137 to the guide-wheels 170, the chain rotating around the sprocket 89. The guide-wheels 170 guide the roller 137 to the beginning of the slot 152. (See Figs. 86, 87, 88.) At the beginning of the slot 152 is also a slot 153, which runs parallel a short distance. In this slot 153 is caused to move the roller 144, and the purpose of which is to cause the arms to remain open to facilitate the placing of the tube upon the funnel-plates, as the tube also rests between the arms 129 (See Figs. 86, 89, 97.) The position of the fork and slide 139 is seen in Fig. 65. The guide-slots are supported and constructed as seen in Figs. 86, 87, 89, 115. The guide-wheels are similar on their periphery, as can be seen in Figs. 34, 86, 87, 88. The slots for the rollers 102 and 137 are continuous and guide the same in their endless movement around the sprockets 88 and 89.

Fig. 118 represents a perspective view of a match-tube as made by the automatic tube-machine now in use by all first-class match-makers.

Figs. 119, 120, 122 represent end views of the various shapes assumed by tubes as they are made by the above-mentioned machine.

Figure 1:
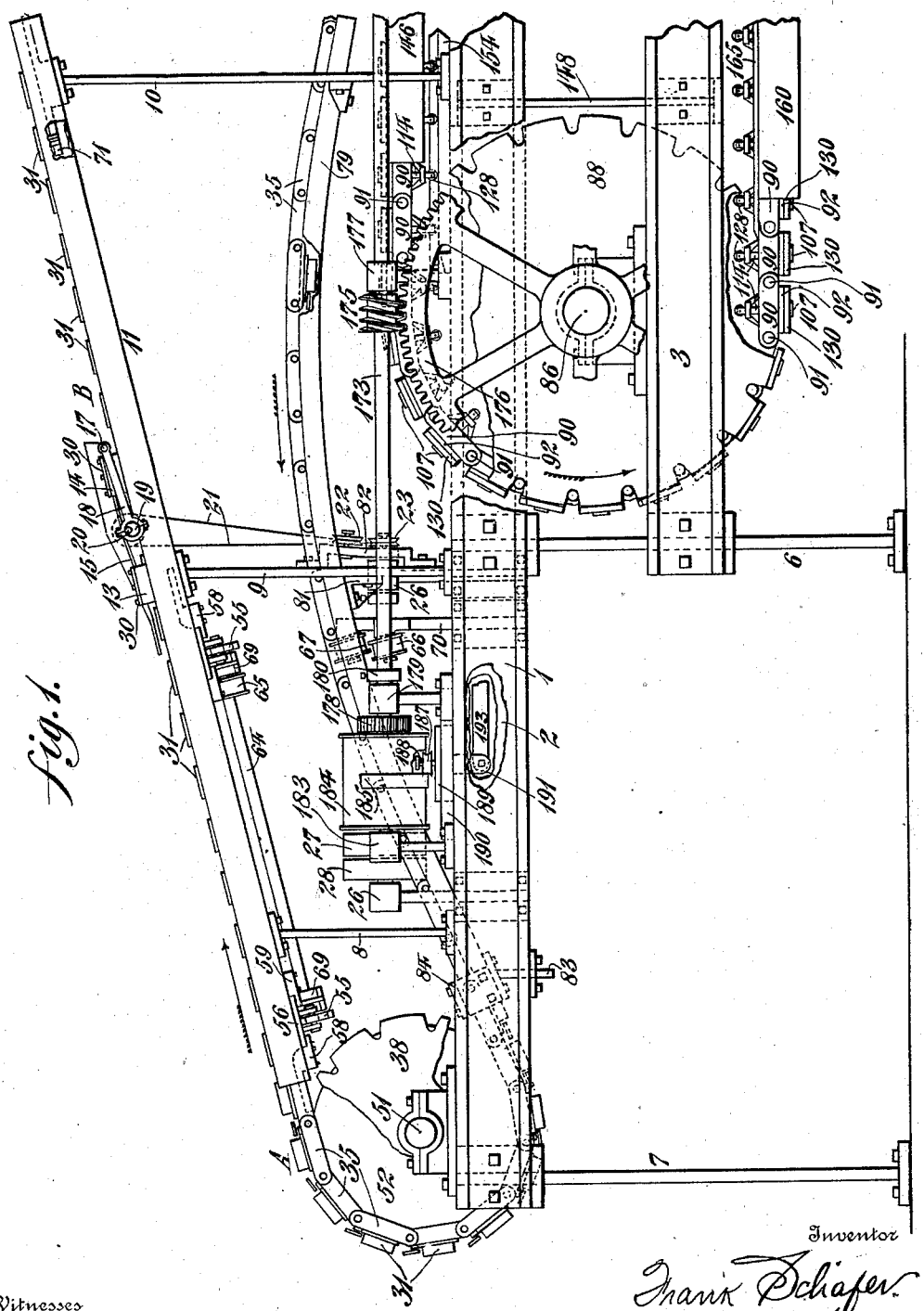

When the operator takes hold of a tube, by pressing upon the edges of the tube it will assume the shape as seen in Fig. 122, from which it will be seen that as the funnel-plates are contracted it allows plenty of room to quickly place the tube upon said funnel-plates.

In Fig. 97 it will be noticed that the tube is not fully upon the funnel, as it is only necessary to place the tube therefrom one-eighth of an inch. As the tube lies between the arms and as the distance from the ends of the funnels to the angle ends of said arms is less than the length of the tube the latter after once placed on funnel and between said arms is not liable to come off and the arms move the tube the proper distance upon the funnels, as hereinbefore described. It is thus plainly seen that as long as full trays of matches are placed on the plate 92, as described, and the tubes placed on the funnel the matches are filled and slide into the tubes automatically.

This machine is adapted to fill either parlor, sulfur, or safety matches.

The method of driving the machine is very simple. A tight pulley 28, around which passes a band or belt in the usual manner, causes the shaft 25 to rotate. (See Figs. 1 and 3.) Secured to shaft 25 is a flanged cone-drum 186, around which passes a belt 185, which also passes around a flanged drum 184, to which motion is imparted by said belt. The drum 184 rotates shaft 182. (See Figs. 1, 2, and 43.) Secured to shaft 182 is a small spur-gear 181. This meshes with a larger gear 178, (see Figs. 1 and 3,) gear 178 being secured to shaft 173, shaft 173 rotating the worm 175, which meshes with worm-gear 176, secured to shaft 86, which rotates the chain of slide mechanism by means of sprockets 88. (See Figs. 1 and 3.) Also secured to shaft 173 is a worm 172, which meshes with worm-gear 171, secured to shaft 173, to which are also secured sprockets 37, which rotate the chain of false boxes. The shaker is caused to reciprocate by means of a belt passing around pulley 24, secured to shaft 25, and runs around idlers 22 and 23, which are loosely mounted on bolts secured to brackets 82, which are secured to stand or support 9. (See Figs. 1 and 3.) The said belt also passes around the pulley on end of shaft 20, to which are secured the eccentric 19, the eccentric-rod 18, &c., as hereinafter explained. The shaft 64, having double eccentrics which reciprocate the false boxes, is driven by a belt passing around pulley 168, idlers 66 and 67, and pulleys 65. (See Figs. 1, 3, and 109.) The thrust of the worms is taken by the bearings 174 and 177, the worms being the same, the pitch and the worm-gears also similar, (see Figs. 1, 2, and 34,) thus insuring a quiet, easy, and powerful driving mechanism and which will cause the two chains to move in unison. The device for regulating the speed of the chain of false boxes is also very simple. By pressing handle 199 and handle end of bar 195 together it lifts the bar 205 out of the rack 206. Moving the bar 195 to the left pushes the slide 189, connected by the link-bars 193. This causes the roller 187 to push the belt 185 to the small diameter of the cone-drum 186, thus decreasing the speed of the drum 184, which, as hereinbefore explained, drives the two chains, thus decreasing the speed of the chain of false boxes and also the chain of slide mechanism, which, as hereinbefore stated, thus move in unison. The belt 185 pulls on the under or lower side, and as it would always run to the largest diameter of the drum 186, which is prevented by the roller 187, (see Figs. 1 and 3,) if it is desired to increase the speed of the two chains the bar 195 is moved to the right, the bar 193 pulling the slide 189 with it, allowing the belt 185 to follow and run on the lower diameter of the cone-drum, thus increasing the speed. The bar 195 can be set at any desired place by dropping the bar 205 in the teeth of the rack 206, the slot-bracket 208 holding it in place. (See Figs. 2 and 105.)

It is apparent that certain parts may be constructed different from what I have shown. For instance, the number of partitions of the false boxes, the shaker, the lifting up of the bridge between the said false boxes, the driving mechanism, also speed-regulating mechanism, the funnel and clamps, the lateral reciprocating device for the false boxes, also the guide-slots.

This machine is especially constructed to fill parlor matches. As every match-maker knows, these matches are easily ignited and that no force can be used to place them in the boxes. As can be seen, the matches are not forced into the false boxes nor into the trays, as they are caused to enter by the incline, the shaking, and their own weight, and thus no force being applied the matches are not ignited. The matches are allowed to drop of their weight upon the shaker, and they fill the boxes voluntarily, only being guided into same and prevented from crossing on account of the partition being narrower than the length of the match. As each box is filled the matches simply slide over these and into the next one, and so on continuously. The trays are slid into the tubes with less force and friction than when filled by a hand operator, and, as hereinbefore explained, the boxes are filled to the desired capacity automatically.

Having thus described my invention, what I claim as new, and desire to secure by Letters Patent, is—

1. In a match-box-filling machine, means for placing the matches in the match-tray, means for placing said tray into a tube, and means moving with the tray and in engagement with the matches the whole length of the tray for locking the matches in said tray during the entire insertion thereof into said tube, said locking means being adapted to enter the tube with said matches in the tray, whereby said matches will be locked in position in the tray during the entire insertion.

2. In a match-box-filling machine, an endless belt or conveyer situated at an incline, which incline is in the line of travel of the conveyer, means for operating the same, false boxes secured to said belt, means for continuously delivering matches into said false boxes, and means for placing the matches into a tray.

3. In a match-box-filling machine, an endless belt or conveyer situated at an incline, which incline is in the line of travel of the conveyer, false boxes carried thereby, partitions in said false boxes, means for continuously delivering matches into said false boxes, which being at an incline will receive the overflow from the adjacent box, and means for removing the matches from said boxes, and placing the same into a tray.

4. In a match-box-filling machine, an endless belt or conveyer situated at an incline, which incline is in the line of travel of the conveyer, means for operating the same, false boxes carried by the same, and a shaker situated at an incline and adapted to deliver matches from one end thereof into said false boxes.

5. In a match-box-filling machine, an endless belt or conveyer, false boxes carried thereby, partitions in said false boxes, a shaker adapted to receive matches from a suitable source and continuously deliver the same into said boxes, which being at an incline cause the overflow to be received in an adjacent box, which incline is in the line of travel of the conveyer, and partitions in said shaker.

6. In a match-box-filling machine, an endless belt or conveyer, false boxes carried thereby, partitions in said false boxes, an inclined reciprocating shaker having partitions thereon adapted to deliver matches into said boxes, whereby said partitions in said boxes and shaker will keep the matches straight at all times.

7. In a match-box-filling machine, an endless belt or conveyer, false boxes movably supported thereon, and means for reciprocating said false boxes laterally with respect to said belt or conveyer.

8. In a match-box-filling machine, an endless belt or conveyer, false boxes carried thereby, a reciprocating shaker adapted to deliver matches to said boxes, and means for imparting a reciprocating lateral motion to said boxes with respect to said belt or conveyer.

9. In a match-box-filling machine, an endless belt or conveyer, false boxes carried thereby and bridges between said false boxes, which are adapted to be raised and lowered in order to have their surfaces substantially in line with the top edges of the boxes at the proper time, in order to guide the matches from one box to the next.

10. In a match-box-filling machine, an endless belt or conveyer, false boxes carried thereby, bridges between said false boxes, and means for raising and lowering said bridges at the proper time.

11. In a match-box filling machine, an endless belt or conveyer, false boxes movably supported thereby, and means for reciprocating said false boxes laterally while the same are being filled with matches.

12. In a match-box-filling machine, an endless belt or conveyer, false boxes carried thereby, bridges between said false boxes, means for raising and lowering said bridges at the proper time, and means for preventing the escape of said matches from said bridges.

13. In a match-box-filling machine, an endless chain or conveyer, false boxes carried thereby, bridges between each of said false boxes, and means for raising and lowering said bridges automatically, whereby said bridges form with said boxes a continuous surface for said matches when in the act of filling.

14. In a match-box-filling machine, an endless belt or conveyer, means for moving said belt, false boxes carried thereby, bridges between said false boxes, means for raising and lowering said bridges, and means for reciprocating said bridges laterally.

15. In a match-box-filling machine, an endless belt or conveyer, means for moving said belt, false boxes carried thereby, means for reciprocating said boxes, bridges between said false boxes, means for lowering and raising said bridges, and means for reciprocating said bridges laterally.

16. In a match-box-filling machine, an endless belt or conveyer, false boxes movably secured on said belt, and a reciprocating device which is adapted to move said boxes laterally with respect to said belt during the forward movement thereof.

17. In a match-box-filling machine, an endless belt or conveyer, false boxes movably secured in said belt, bridges between said false boxes, and a reciprocating device adapted to move said boxes and bridges laterally during the forward movement thereof.

18. In a match-box-filling machine, an endless chain or conveyer, false boxes carried thereby, bridges between said boxes, means for raising and lowering said bridges at the proper time, and a reciprocating device which is adapted to move said boxes and bridges laterally, increasing and decreasing the lateral movement during the forward movement of said chain.

19. In a match-box-filling machine, an endless chain or conveyer, bridges and false boxes carried thereby, a reciprocating device therefor, and a tapering guide adapted to properly direct the bridges and false boxes to engage with the reciprocating device.

20. In a match-box-filling machine, an endless chain or conveyer, false boxes carried thereby, bridges between said false boxes, means for imparting a lateral movement to said bridges and boxes, sprocket-wheels for said chain or conveyer and a guide-wheel for said bridges and boxes as said chain passes around said sprockets.

21. In a match-box-filling machine, false boxes suitably supported and adapted to be moved to a source of supply, said boxes being suitably connected together, in order to move one another, means intermediate said boxes which is adapted to be raised in order to bridge the space between said boxes when the matches are being fed thereto and means for imparting a reciprocating motion to said boxes, which latter movement is in a plane at an angle to the plane of the first-mentioned movement.

22. In a match-box-filling machine, an endless chain or conveyer adapted to receive the trays, means for filling said trays while on said conveyer, means for imparting a reciprocating motion to said trays, means for depositing said trays on a plate, an endless chain or conveyer carrying said plate, which latter is adapted to carry a tube, and means on said plate for automatically sliding the tray into the tube.

23. In a match-box-filling machine, an endless chain or conveyer, plates carried thereby and adapted to receive trays having matches therein, means on said plate adapted to carry a tube, means for expanding said carrying means, and means on said plates for automatically sliding said trays into tubes during the forward movement of said chain.

24. In a match-box-filling machine, an endless belt or conveyer, means for moving said belt, false boxes carried thereby, a bridge between each of said false boxes, means for raising and lowering said bridges and means for reciprocating said bridges in a lateral direction with respect to the forward movement of the chain, whereby the matches will not remain on the bridges but will be removed therefrom.

25. In a match-box-filling machine, an endless chain or conveyer, a plate carried thereby adapted to receive a tube, means for depositing upon said plate a filled match-tray, means on said plate for holding said match-tray and a movable pusher carried by said plate and adapted to automatically slide the match-tray into the tube and to lock the matches in the tray during the entire insertion into the tube.

26. In a match-box-filling machine, an endless belt or conveyer, plates carried thereby and adapted to receive a match-tray, means on said plate for receiving and forwarding a tube, a pusher on each of said plates having means for locking the matches in the tray, means for imparting a lateral forward and backward motion to said pusher and said locking means, and means for raising and lowering the end of said pusher carrying the locking means at the proper time.

27. In a match-box-filling machine, an endless chain or conveyer, plates carried thereby and adapted to receive a match-tray, a pusher on each of said plates, means for imparting a forward-and-back movement to said pushers, and means on said pushers for holding or locking the matches in said tray.

28. In a match-box-filling machine, an endless chain or conveyer, plates carried thereby, and adapted to receive a match-tray, pushers on said plates, means on said pushers for locking the matches in said tray, means for imparting a lateral movement to said pushers, and means for raising and lowering said pushers.

29. In a match-box-filling machine, an endless chain or conveyer, plates carried thereby and adapted to receive a match-tray, pushers on said plates, means on said pushers for locking the matches in said tray, tracks or guides on the frame of said machine, and means on said pushers for engaging with said tracks.

30. In a match-box-filling machine, an endless chain or conveyer, plates carried thereby, funnels on said plates adapted to receive a tube, and adapted to move with said chain, to be automatically operated during the movement of said chain, and means for opening and closing said funnels whereby the tube thereon is expanded.

31. In a match-box-filling machine, an endless chain or conveyer, plates carried thereby, funnels on said plates, and means for automatically expanding and contracting said funnels.

32. In a match-box-filling machine, an endless chain or conveyer, plates carried thereby, funnels on said plates, guides on the frame of said machine, and means connected with said funnels operated by said guides to open and close said funnels.

33. In a match-box-filling machine, an endless chain or conveyer, plates carried thereby, a frame secured to each of said plates, arms connected with said frame and funnel-plates on said arms, which are automatically moved toward or away from each other.

34. In a match-box-filling machine, an endless chain or conveyer, plates carried thereby, a frame secured to each of said plates, arms carried by said frame, funnels on said arms, and means for moving said arms to expand and contract said funnel.

35. In a match-box-filling machine, an endless chain or conveyer, plates carried thereby, funnels on said plates, a track or guide on the frame of the machine, and means connected with said funnels and adapted to move in said tracks.

36. In a match-box-filling machine, an endless chain or conveyer, plates carried thereby, jaws on said plates, guides on the frame of said machine, means for moving said jaws laterally in said plates and means connected with each of said jaws adapted to move in said guides for opening and closing both of said jaws.

37. In a match-box-filling machine, an endless chain or conveyer, plates carried thereby, a pusher on each of said plates, means for operating said pushers, a funnel carried by each of said plates, means for operating said funnels, jaws on said plates and means for operating said jaws.

38. In a match-box-filling machine, an endless chain or conveyer, plates carried thereby, a frame on each of said plates, arms pivoted to said frame-carrying funnel-plates, arms pivoted to said first-mentioned arms and sliding on said frame-carrying funnel-plates, and means for operating said arms to move said funnel-plates toward or away from each other.

39. In a match-box-filling machine, an endless chain or conveyer, plates carried thereby, pushers carried thereby, and a spring-steel blade on each of said pushers, adapted to lock matches in a tray.

40. In a match-box-filling machine, false boxes suitably supported, means for moving said boxes to a suitable source of supply, means for reciprocating said boxes, bridges between said false boxes, means for raising and lowering said bridges, and said bridges being reciprocated.

41. In a match-box-filling machine, an endless chain or conveyer, plates carried thereby, movable clamps on said plates, extension ends on said clamps having teeth meshing with each other, and means for operating said extensions and said clamps.

42. In a match-box-filling machine, an endless chain or conveyer, plates carried thereby, pushers on said plates, funnels on said plates, and jaws or clamps on said plates, and tracks or guides carried by said machine which are adapted to control the action of said funnels, pushers and jaws.

43. In a match-box-filling machine, an endless chain or conveyer, plates carried thereby, a pusher carried by each of said plates, a funnel carried by each of said plates, a jaw carried by each of said plates, tracks adapted to control the movement of said parts, and a guide for said pusher, funnels and jaws.

44. In a match-box-filling machine, false boxes suitably supported, bridges between said false boxes which are adapted to have their surfaces substantially level with the top edge of the boxes and a reciprocating device which is adapted to move said boxes and bridges laterally, increasing and decreasing the lateral movement during the movement of the chain.

45. In a match-box-filling machine, an endless chain or conveyer, false boxes carried thereby, bridges between said boxes, means for raising and lowering said bridges, means for imparting a lateral movement to said bridges and boxes, wheels for said chain or conveyer and a guide for said bridges and boxes.

46. In a match-box-filling machine, an endless chain or conveyer, false boxes carried thereby, bridges between said boxes, means for raising and lowering said bridges, wheels around which said chain passes, a guide for said boxes and bridges, as the chain passes around said wheels, means for discharging matches into said false boxes after which inverted trays are placed thereon, and means for holding said trays on said boxes as the said chain passes around said wheels.

47. In a match-box-filling machine, an endless chain or conveyer, false boxes carried thereby, bridges between said boxes, wheels around which said chain passes, a guide for said boxes and bridges, as the chain passes around said wheels, means for discharging matches into said false boxes after which inverted trays are placed thereon, means for holding said trays on said boxes as the said chain passes around said wheels, and means for raising said bridges during the act of filling, and for lowering said bridges before said trays are placed in position.

48. In a match-box-filling machine, means for placing the matches in a match-tray, means for inserting said tray into a tube, a locking device carried by said inserting means for holding the matches in said tray, and means for actuating said device.

49. In a match-box-filling machine, means for placing the matches in a match-tray, means for automatically delivering said tray to a tube, and means for automatically inserting said tray into said tube, and locking the matches in the tray during the entire insertion of the tray in a tube.

50. In a match-box-filling machine, an endless chain or conveyer, carrying a tube and adapted to receive a filled match-tray, and means for automatically inserting said tray in said tube, and moving with the tray and in engagement with the matches the whole length of the tray for locking the matches in said tray during the insertion thereof.

51. In a match-box-filling machine, an endless chain or conveyer, boxes carried thereby, means for filling said boxes, means for depositing said filled boxes upon an endless belt or conveyer, means carried by said last-mentioned belt or conveyer for inserting said boxes in suitable tubes, and means moving with the trays and in engagement with the matches the whole length of the tray for locking the matches in the trays during the insertion.

52. In a match-box-filling machine, an endless belt or conveyer, false boxes carried thereby, and bridges on said conveyer, the upper surfaces of which are in line with the upper edges of the boxes when the latter are being filled, whereby the matches can pass from one box to the next.

53. In a match-box-filling machine, an endless belt or conveyer, false boxes carried thereby, bridges between said boxes and partitions on said bridges.

54. In a match-box-filling machine, an endless belt or conveyer, false boxes carried thereby, a shaker for delivering the matches to said boxes, partitions on said shakers, bridges between said boxes and partitions on said bridges.

55. In a match-box-filling machine, an endless chain or conveyer, false boxes carried thereby, bridges between said boxes, the upper surfaces of which are substantially in line with the upper edge of the boxes when the latter are being filled, and means for reciprocating said bridges laterally.

56. In a match-box-filling machine, a funnel adapted to receive a match-tube, and means for automatically expanding and contracting said funnel.

57. In a match-box-filling machine, an endless belt or conveyer, plates carried thereby, and a funnel on each of said plates, and means for automatically expanding and contracting said funnel.

58. In a match-box-filling machine, an endless chain or conveyer, plates carried thereby, jaws carried on said plates, means for automatically opening and closing said jaws, and means for moving said jaws laterally with respect to said plates.

59. In a match-box-filling machine, an endless chain or conveyer, a plate carried thereby and adapted to receive a match-tray, means on said plate for holding a tube, means on said plate for inserting said tray in said tube, means for locking the matches in the tray, and means for raising and lowering said locking means with respect to said plate, whereby the same passes freely through the tube until in proper position, when it is lowered to lock the matches.

60. In a match-box-filling machine, an endless chain or conveyer, false boxes carried thereby, means for filling said boxes, means for depositing said matches from said boxes into trays and for depositing the trays on a second endless belt or conveyer, means for positioning the tubes carried thereby, means thereon for grasping said trays, means for supporting said tubes, means for inserting said trays in said tubes, and means for removing said tubes and inserted trays from said supporting means.

61. In a match-box-filling machine, a funnel to receive match-tubes, means for expanding said funnel, a pusher for inserting a filled tray into said expanded tube, means for locking the matches on said tray during the insertion, means for grasping the tube and inserted tray, means for removing the locking device from said tray and means for withdrawing said tube and tray from said funnel.

62. In a match-box-filling machine, an endless chain or conveyer, false boxes carried thereby, means for filling said boxes with matches, means for depositing said matches from said boxes into trays, an endless belt or conveyer adapted to receive said trays, a guide for directing said trays to the proper point, plates on said last-mentioned belt or conveyer, lugs thereon between which the trays are deposited, and recesses in said lugs in which the end of the guide enters, and means on said plates for inserting the trays into the tubes.

63. In a match-box-filling machine, means for supporting a match-tube, means for expanding said supporting means, means for inserting a filled match-tray into said tube, means for locking the matches in said tray during the inserting, means for grasping said tube and inserted tray, means for removing said locking means from said tray, and means for removing said tube and tray from said supporting means.

64. In a match-box-filling machine, means for inserting a match-tray into a tube and means moving with the tray and in engagement with the matches the whole length of the tray and adapted to enter said tube for locking said matches in said tray during the entire insertion.

65. In a match-box-filling machine, means for supporting a match-tube, means for automatically expanding said supporting means, whereby said match-tube is properly expanded, means for inserting a match-tray into said tube, and means for removing said tube and inserting a tray from said supporting means.

66. In a match-box-filling machine, a funnel adapted to receive a match-tube, means for expanding and contracting said funnel, means for inserting a tray into said tube, jaws adapted to grasp said tube and means for moving said jaws to remove the tray and tube from said funnel.

67. In a match-box-filling machine, means for holding the tube, a pusher for inserting said tray in said tube, and means on said pusher for holding or locking the matches in said tray.

68. In a match-box-filling machine, means for inserting a match-tray into a tube, means for locking said matches in said tray during the entire insertion, and means for removing said locking means from said tube.

69. In a match-box-filling machine, means for holding the tube, means for filling the tray, means for inserting said tray in said tube, and means for holding the matches in the tray and moving with said tray during the entire insertion.

70. In a match-box-filling machine, means for filling the tray, means for holding the tube, a pusher, and a blade on said pusher adapted to lock the matches in said tray.

71. In a match-box-filling machine, means for filling the tray, means for holding the tube, means for locking the matches in said tray, said tube receiving said tray and locking means during the entire insertion.

72. In a match-box-filling machine, means for filling a match-tray, an endless chain or conveyer, plates carried thereby and adapted to receive the filled tray, movable clamps on said plates for engaging said tray, extension ends on said clamps suitably connected with each other, and means for operating said extension ends and said clamps.

73. In a match-box-filling machine, means for filling a match-tray, an endless chain or conveyer adapted to receive the match-tray, clamps carried by said chain and adapted to grasp the match-tray, means for opening and closing the jaws of said clamps with respect to each other, and means for moving said clamps longitudinally with respect to said chains, the latter movement being at an angle to the plane of movement of the jaws on said clamp during the opening and closing thereof.

FRANK SCHAFER.

Witnesses:
JOHN A. WIEDERSHEIM,
C. D. McVAY.